United States Patent
Chen et al.

(10) Patent No.: US 12,542,736 B2
(45) Date of Patent: Feb. 3, 2026

(54) METHOD FOR PERFORMING ADAPTIVE MULTI-LINK AGGREGATION DISPATCHING CONTROL IN MULTI-LINK OPERATION ARCHITECTURE, AND ASSOCIATED APPARATUS

(71) Applicant: MEDIATEK INC., Hsin-Chu (TW)

(72) Inventors: Kuo-Wei Chen, Hsinchu (TW); Chia-Shun Wan, Hsinchu (TW); Cheng-En Hsieh, Hsinchu (TW); Po-Chi Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 71 days.

(21) Appl. No.: 18/211,299

(22) Filed: Jun. 19, 2023

(65) Prior Publication Data

US 2024/0098016 A1   Mar. 21, 2024

Related U.S. Application Data

(60) Provisional application No. 63/376,124, filed on Sep. 19, 2022.

(51) Int. Cl.
*H04W 76/15* (2018.01)
*H04L 45/24* (2022.01)
*H04W 76/20* (2018.01)

(52) U.S. Cl.
CPC .......... *H04L 45/245* (2013.01); *H04W 76/15* (2018.02); *H04W 76/20* (2018.02)

(58) Field of Classification Search
CPC ... H04L 45/245; H04L 1/1614; H04L 1/1887; H04L 1/1825; H04W 76/15
See application file for complete search history.

(56) References Cited

U.S. PATENT DOCUMENTS

| 2002/0089994 A1* | 7/2002 | Leach, Jr. | H04W 8/04 370/392 |
| 2006/0203752 A1* | 9/2006 | Ginzburg | H04L 1/1685 370/278 |

(Continued)

FOREIGN PATENT DOCUMENTS

| CN | 113015220 A | 6/2021 |
| JP | 2008219673 A * | 9/2008 |

(Continued)

*Primary Examiner* — Ayman A Abaza
*Assistant Examiner* — Alyssa Williams
(74) *Attorney, Agent, or Firm* — Winston Hsu

(57) ABSTRACT

A method for performing adaptive multi-link aggregation dispatching control in multi-link operation architecture and associated apparatus are provided. The method applicable to a wireless transceiver device within a wireless communications system may include: utilizing the wireless transceiver device to communicate with another device within the wireless communications system to set up multiple links respectively corresponding to multiple predetermined radio frequency bands, to allow the wireless transceiver device and the other device to perform data transmission through the multiple links; and performing a dispatching management procedure to selectively perform dispatching regarding a first link among the multiple links, for transmitting a first physical layer (PHY) protocol data unit (PPDU) corresponding to a block acknowledgment (BA) window through the first link, wherein the dispatching regarding the first link includes temporarily reducing a number of medium access control (MAC) protocol data units (MPDUs) corresponding to the BA window in the first PPDU.

16 Claims, 12 Drawing Sheets

(56) References Cited

U.S. PATENT DOCUMENTS

| | | | |
|---|---|---|---|
| 2011/0188424 A1 | 8/2011 | Ramamurthy | |
| 2016/0029432 A1* | 1/2016 | Sun | H04L 1/004 370/277 |
| 2016/0330755 A1* | 11/2016 | Ding | H04W 72/121 |
| 2017/0311204 A1* | 10/2017 | Cariou | H04W 28/085 |
| 2018/0035426 A1 | 2/2018 | Barriac | |
| 2018/0206284 A1* | 7/2018 | Zhou | H04L 1/1887 |
| 2020/0037324 A1* | 1/2020 | Chu | H04L 1/0057 |
| 2020/0288523 A1* | 9/2020 | Patil | H04W 80/02 |
| 2020/0314920 A1* | 10/2020 | Seok | H04W 74/0808 |
| 2021/0083805 A1* | 3/2021 | Kneckt | H04L 1/1642 |
| 2021/0211234 A1* | 7/2021 | Kneckt | H04L 1/1614 |
| 2022/0321265 A1 | 10/2022 | Sang | |
| 2022/0345247 A1* | 10/2022 | Guo | H04L 1/188 |
| 2023/0276516 A1 | 8/2023 | Shirakawa | |
| 2023/0362975 A1* | 11/2023 | Hirata | H04W 72/566 |
| 2024/0049059 A1* | 2/2024 | Smith | H04W 28/0263 |
| 2024/0049304 A1* | 2/2024 | Ko | H04W 74/0816 |
| 2024/0089158 A1* | 3/2024 | Park | H04L 1/0025 |
| 2024/0244481 A1* | 7/2024 | Viger | H04W 28/0278 |
| 2024/0365415 A1* | 10/2024 | Li | H04L 47/34 |

FOREIGN PATENT DOCUMENTS

| | | | | |
|---|---|---|---|---|
| WO | WO-2015148180 A1 * | 10/2015 | | H04L 45/245 |
| WO | 2021/246250 A1 | 12/2021 | | |

\* cited by examiner

METHOD FOR PERFORMING ADAPTIVE MULTI-LINK AGGREGATION DISPATCHING CONTROL IN MULTI-LINK OPERATION ARCHITECTURE, AND ASSOCIATED APPARATUS

CROSS REFERENCE TO RELATED APPLICATIONS

This application claims the benefit of U.S. Provisional Application No. 63/376,124, filed on Sep. 19, 2022. The content of the application is incorporated herein by reference.

BACKGROUND

The present invention is related to communications control, and more particularly, to a method for performing adaptive multi-link aggregation dispatching control in multi-link operation (MLO) architecture, and associated apparatus such as an access point (AP) device.

According to the related art, a wireless communications device in a wireless local area network (WLAN) may try sending data to another wireless communications device through multiple links, and multiple sets of partial data corresponding to multiple acknowledgment/ack windows among the data may be sent to the other wireless communications device, respectively. However, some problems such as reduced performance may occur if certain conditions are met. It seems that no proper suggestion has been proposed in the related art. Thus, a novel method and associated architecture are needed for solving the problems without introducing any side effect or in a way that is less likely to introduce a side effect.

SUMMARY

It is an objective of the present invention to provide a method for performing adaptive multi-link aggregation dispatching control in MLO architecture, and associated apparatus such as an AP device, in order to solve the above-mentioned problem.

At least one embodiment of the present invention provides a method for performing adaptive multi-link aggregation dispatching control in MLO architecture, where the method can be applied to a wireless transceiver device within a wireless communications system. For example, the method may comprise: utilizing the wireless transceiver device to communicate with another device within the wireless communications system to set up multiple links respectively corresponding to multiple predetermined radio frequency bands, to allow the wireless transceiver device and the other device to perform data transmission through the multiple links; and performing a dispatching management procedure to selectively perform dispatching regarding a first link among the multiple links, for transmitting a first physical layer (PHY) protocol data unit (PPDU) corresponding to a block acknowledgment (BA) window through the first link, wherein the dispatching regarding the first link comprises temporarily reducing a number of medium access control (MAC) protocol data units (MPDUs) corresponding to the BA window in the first PPDU.

At least one embodiment of the present invention provides a wireless transceiver device for performing adaptive multi-link aggregation dispatching control in MLO architecture, where the wireless transceiver device is one of multiple devices within a wireless communications system. The wireless transceiver device may comprise a processing circuit that is arranged to control operations of the wireless transceiver device. The wireless transceiver device may further comprise at least one communications control circuit that is coupled to the processing circuit and arranged to perform communications control, wherein the at least one communications control circuit is arranged to perform wireless communications operations with another device among the multiple devices for the wireless transceiver device. For example, the wireless transceiver device is arranged to communicate with the other device to set up multiple links respectively corresponding to multiple predetermined radio frequency bands, to allow the wireless transceiver device and the other device to perform data transmission through the multiple links; and the wireless transceiver device is arranged to perform a dispatching management procedure to selectively perform dispatching regarding a first link among the multiple links, for transmitting a first PPDU corresponding to a BA window through the first link, wherein the dispatching regarding the first link comprises temporarily reducing a number of MPDUs corresponding to the BA window in the first PPDU.

According to some embodiments, the apparatus may comprise at least one portion (e.g., a portion or all) of the wireless communications system. For example, the apparatus may represent a portion of the wireless communications system, such as the wireless transceiver device (e.g., an AP device). In some examples, the apparatus may represent the whole of the wireless communications system.

It is an advantage of the present invention that, through proper design, the present invention method, as well as the associated apparatus such as the wireless transceiver device, can adaptively control dispatching behaviors, and more particularly, dynamically send dispatched PPDUs with less numbers of sequence numbers (SNs) corresponding to a BA window to the other device (e.g., a station (STA) device), to make the other device receive data correctly in time, in order to achieve a better communications result, and therefore enhance the overall performance. In addition, the present invention method and apparatus can solve the related art problem without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
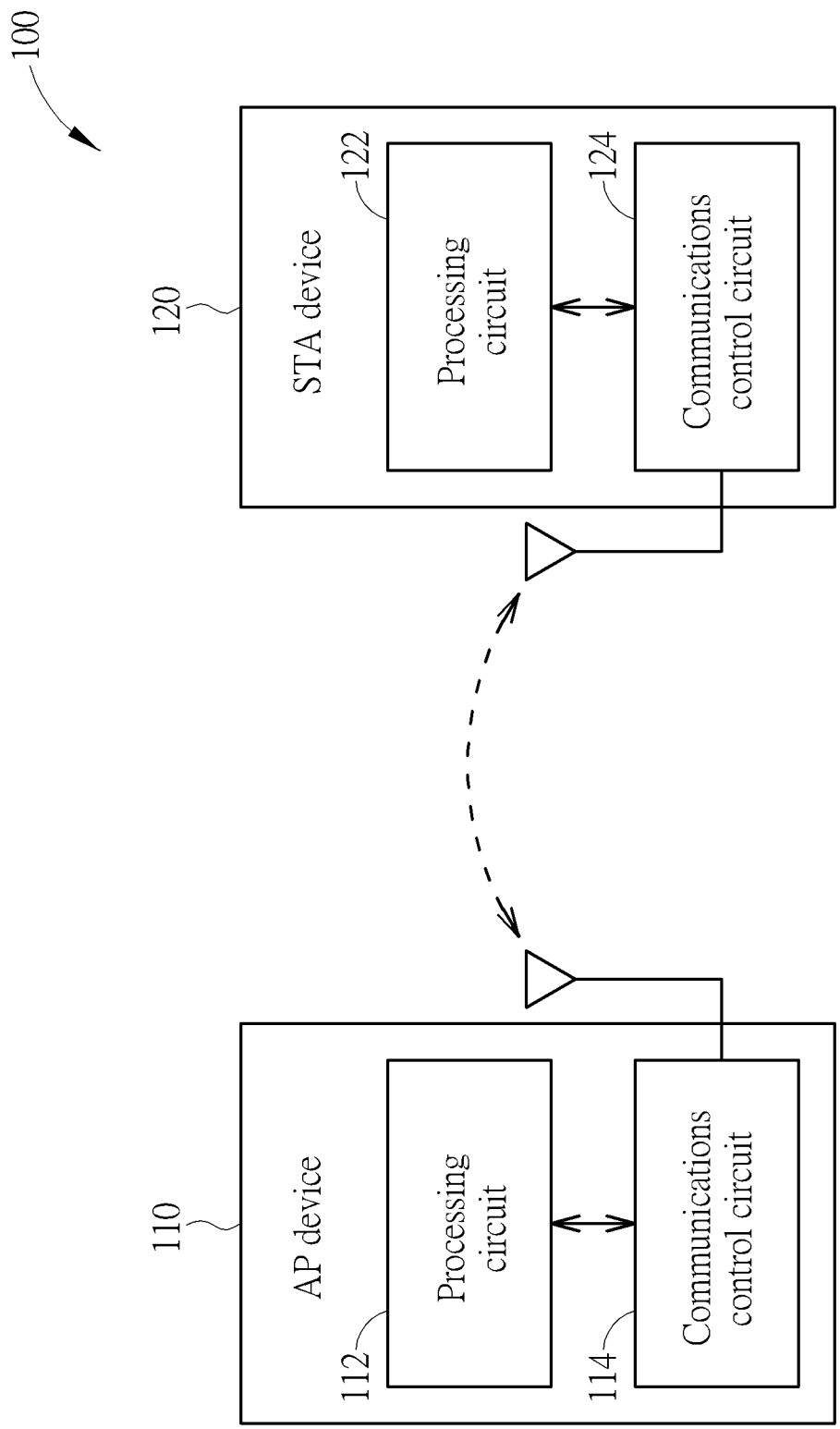
FIG. 1 is a diagram of a wireless communications system according to an embodiment of the present invention.

FIG. 1 is a diagram of a wireless communications system 100 according to an embodiment of the present invention. For better comprehension, the wireless communications system 100, as well as any wireless transceiver device therein, may be compatible or back-compatible to one or more versions of the Institute of Electrical and Electronics Engineers (IEEE) 802.11 standards, but the present invention is not limited thereto. The wireless communications system 100 may comprise multiple wireless transceiver devices. As shown in FIG. 1, the multiple wireless transceiver devices within the wireless communications system 100 may comprise the AP device 110 and the STA device 120, where the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124.

In the architecture shown in FIG. 1, the processing circuit 112 can be arranged to control operations of the AP device 110 to make the AP device 110 act as at least one AP in the wireless communications system 100, such as multiple APs integrated into the AP device 110, and the communications control circuit 114 can be arranged to perform communications control, and more particularly, perform wireless communications operations with the STA device 120 (or the communications control circuit 124 thereof) for the AP device 110. In addition, the processing circuit 122 can be arranged to control operations of the STA device 120 to make the STA device 120 act as at least one STA in the wireless communications system 100, such as multiple STAs integrated into the STA device 120, and the communications control circuit 124 can be arranged to perform communications control, and more particularly, perform wireless communications operations with the AP device 110 (or the communications control circuit 114 thereof) for the STA device 120.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. Examples of the AP device 110 may include, but are not limited to: a Wi-Fi router. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto. Examples of the STA device 120 may include, but are not limited to: a multifunctional mobile phone, a laptop computer, an all-in-one computer and a wearable device.

As shown in FIG. 1, the multiple wireless transceiver devices within the wireless communications system 100 may comprise the AP device 110 and the STA device 120. This is for illustrative purposes only, and is not meant to be a limitation of the present invention. According to some embodiments, the multiple wireless transceiver devices within the wireless communications system 100 may be implemented by way of multiple multi-link devices (MLDs).

Figure 2:
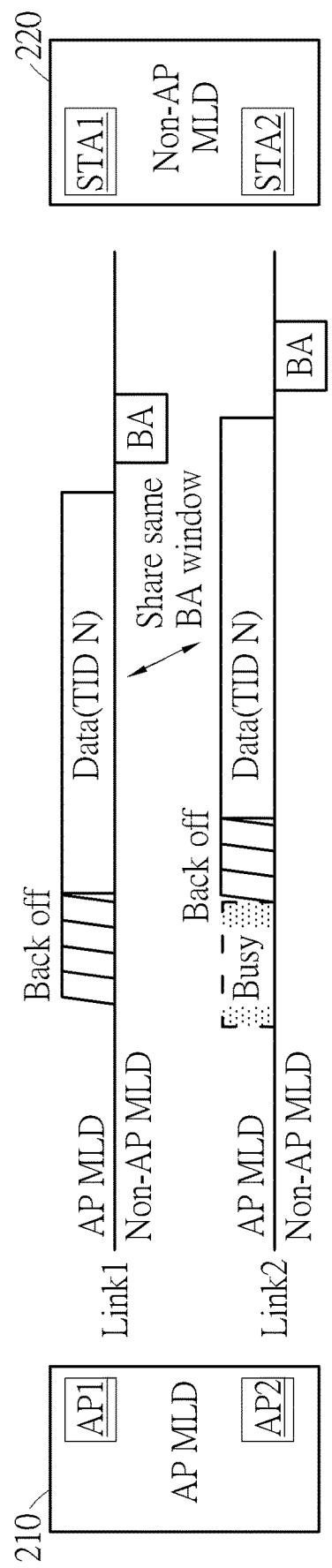
FIG. 2 is a diagram illustrating a MLO scheme that 'traffic identifier (TID) N' sharing the same BA window is transmitted through two links.

FIG. 2 is a diagram illustrating a MLO scheme that 'TID N' sharing the same BA window is transmitted through two links. The AP MLD 210, having the APs AP1 and AP2, and the non-AP MLD 220, having the STAs STA1 and STA2, may communicate with each other to set up multiple links (e.g., the links Link1 and Link2) corresponding to multiple predetermined radio frequency bands (e.g., the 2.4 gigahertz (GHz) band and the 5 GHz band), where the AP MLD 210 and the non-AP MLD 220 may be taken as examples of the multiple multi-link devices MLDs, but the present invention is not limited thereto. According to some embodiments, the multiple predetermined radio frequency bands and the radio frequency band count thereof, the APs in the AP MLD 210 and the AP count thereof, the STAs in the non-AP MLD 220 and the STA count thereof, and the multiple links and the link count thereof may vary. For example, the multiple predetermined radio frequency bands may comprise any two radio frequency bands among the 2.4 GHz band, the 5 GHz band and the 6 GHz band. In some examples, the multiple predetermined radio frequency bands may comprise more than two radio frequency bands such as the 2.4 GHz band, the 5 GHz band and the 6 GHz band, the AP MLD 210 may comprise more than two APs, and the non-AP MLD 220 may comprise more than two STAs.

In the MLO architecture shown in FIG. 2, the functionality and structure of the STA STA1/STA2 are the same or approximately the same with the STA device 120 disclosed in the embodiment shown in FIG. 1, the functionality and structure of the AP AP1/AP2 are the same or approximately the same with the AP 110 disclosed in the embodiment shown in FIG. 1. One of the STAs STA1 and STA2 in the non-AP MLD 220 (for example, the STA STA1) may send an association request to one of the APs AP1 and AP2 in the AP MLD 210 on the same radio frequency channel, for example AP1. Then, upon receiving the association request, the AP1 would send an association response to the STA STA1, to complete a successful multi-link setup. Similar connection setup would occur to the AP AP2 and the STA STA2 on the same radio frequency channel. As a result, the APs AP1 and AP2 may establish the links {Link1, Link2} between the APs {AP1, AP2} and the STAs {STA1, STA2}, respectively.

Among the multiple multi-link devices MLDs such as the AP MLD 210 and the non-AP MLD 220, a transmitting MLD shall maintain one sequence number space for each TID that may be transmitted to a peer receiving MLD over one or more links subject to TID to link mapping negotiated between the transmitting MLD and the peer receiving MLD. In addition, among the multiple multi-link devices MLDs such as the AP MLD 210 and the non-AP MLD 220, an initiating MLD shall maintain one transmission window for each block ack (BA) agreement negotiated with the responding MLD to submit MPDUs for transmission across links subjected to the TID to link mapping negotiated between the initiating MLD and the responding MLD. Based on the MLO architecture shown in FIG. 2, the AP MLD 210 and the non-AP MLD 220 may communicate with each other to perform data transmission regarding data corresponding to a TID N, such as the data Data(TID N). The AP MLD 210 may send the data Data(TID N) to the non-AP MLD 220 through the links Link1 and Link2, and more particularly, send multiple sets of partial data {Data$_1$(TID N), Data$_2$(TID N), . . . } among the data Data(TID N) to the non-AP MLD 220 in accordance with multiple BA windows, respectively. For example, the AP MLD 210 may transmit a set of partial data corresponding to a same BA window among the multiple sets of partial data {Data$_1$(TID N), Data$_2$ (TID N), . . . } through the links Link1 and Link2, and the non-AP MLD 220 may transmit a BA frame (labeled "BA" for brevity) through any link among the links Link1 and Link2, where different links such as the links Link1 and Link2 may share the same BA window. As a result, the AP MLD 210 and the non-AP MLD 220 may complete the data transmission regarding the data Data(TID N) corresponding to the TID N as soon as possible.

For example, the data corresponding to the TID N may represent data having the highest or higher priority among all data to be transmitted, such as video data and/or audio data, but the present invention is not limited thereto. According to some embodiments, the data type of the data may vary. In addition, the multiple sets of partial data may be carried by multiple MPDUs with sequence numbers (SNs), respectively, but the present invention is not limited thereto.

Figure 3:
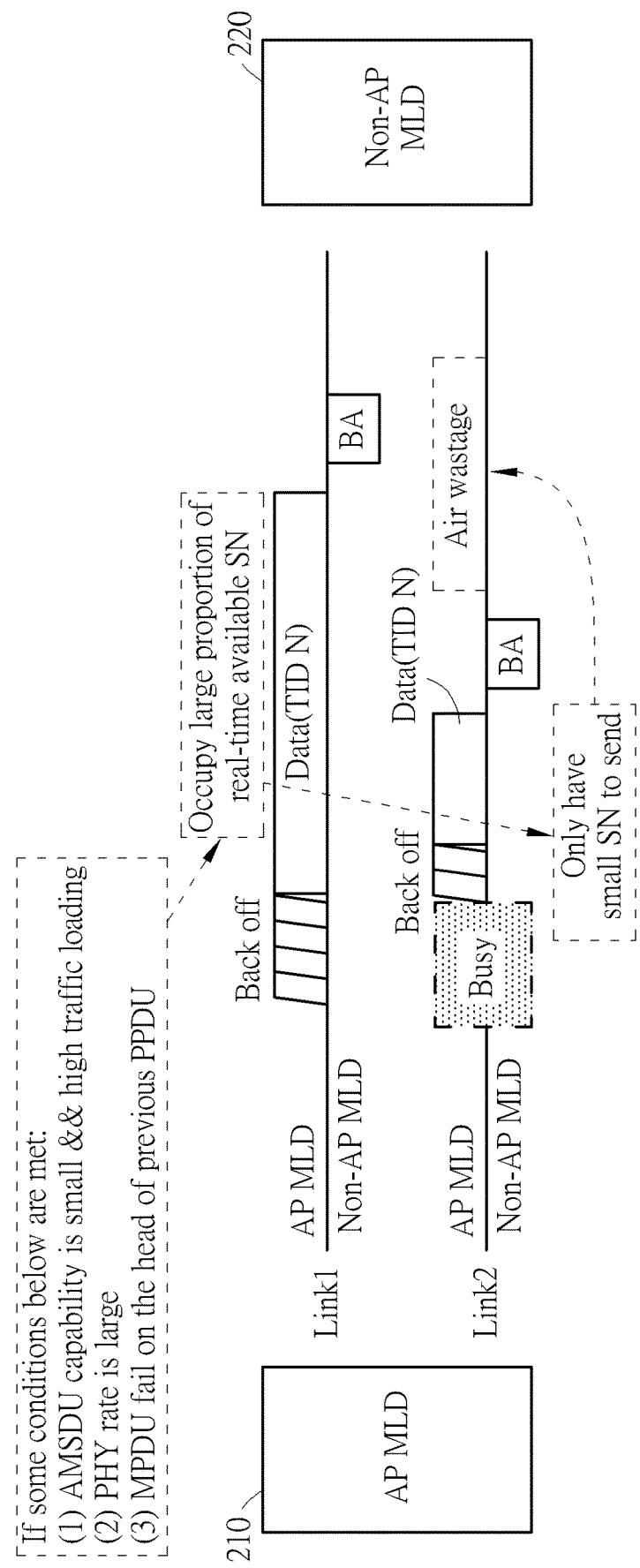
FIG. 3 is a diagram illustrating a problem aroused from an air wastage phenomenon when some conditions are met in the MLO scheme shown in FIG. 2.

FIG. 3 is a diagram illustrating a problem aroused from an air wastage phenomenon when some conditions are met in the MLO scheme shown in FIG. 2. For example, these conditions may comprise:

(1) aggregate medium access control (MAC) service data unit (A-MSDU) capability is small and there is high traffic loading;
(2) PHY rate is high; and
(3) any relatively small SN MAC protocol data unit (MPDU)'s header or frame body is failed to be decoded on the previous PPDU.

When the three conditions listed above are met, the PPDU transmitted through the link Link1 among two PPDUs corresponding to the current BA window may occupy a large proportion of real-time available SNs (or the MPDUs with these SNs), and the PPDU transmitted through the link Link2 among the two PPDUs corresponding to the current BA window may only have a small proportion of SNs (or the MPDUs with these SNs) to send, causing the air wastage of the link Link2 as shown in FIG. 3. Based on one or more control schemes, the AP MLD 210 may perform suitable dispatching for different situation, respectively, to enhance the overall performance.

For better comprehension, some implementation details regarding the BA frame and the sequence number (SN) may be described as follows. According to some embodiments, during sending the data corresponding to the TID N to the non-AP MLD 220, the AP MLD 210 may transmit the MPDUs with the associated SNs to the non-AP MLD 220, and the non-AP MLD 220 may prepare a Compressed Block Ack frame according to a predetermined BA format to be the BA frame, for being sent to the AP MLD 210, where the predetermined BA format may comprise a BA Information field, the BA Information field may comprise a Block Ack Starting Sequence Control field and a Block Ack Bitmap subfield, and the Block Ack Starting Sequence Control field may comprise a Fragment Number subfield. If the bit B0 of the Fragment Number subfield is 0, the Block Ack Bitmap subfield of the BA Information field of the Compressed Block Ack frame may indicate the receive status of up to 64 or 256 MAC service data units (MSDUs) and/or A-MSDUs depending upon the value of the bits B2-B1 in the Fragment Number subfield. More particularly, each bit that is equal to 1 in the Block Ack Bitmap subfield may be arranged to acknowledge the reception of a single MSDU or A-MSDU in the order of sequence number (SN), with the first bit of the Block Ack Bitmap subfield corresponding to the MSDU, or A-MSDU, or fragment thereof with the sequence number that matches the value of the Starting Sequence Number subfield of the Block Ack Starting Sequence Control subfield. In addition, if the bit B0 of the Fragment Number subfield is 1, the Block Ack Bitmap subfield of the BA Information field of the Compressed Block Ack frame may indicate the receive status of up to 16 or 64 MSDUs and/or A-MSDUs depending upon the value B2-B1 in the Fragment Number subfield. If the bit position n of the Block Ack Bitmap subfield is 1, it may be arranged to acknowledge receipt of an MPDU with the sequence number value SN and the fragment number value FN with $n=4\times(SN-SSN)+FN$, where SSN is the value of the Starting Sequence Number subfield of the Block Ack Starting Sequence Control subfield and the operations on the sequence numbers are performed modulo 4096. If the bit position n of the Block Ack Bitmap subfield is 0, it may indicate that the MPDU has not been received.

TABLE 1

| B0 | B1 | B2 | B3 | B4 | B5 | B6 | B7 | B8 | B9 | B10 | B11 | B12 | B15 | B14 | B15 |
|----|----|----|----|----|----|----|----|----|----|-----|-----|-----|-----|-----|-----|
| Fragment Number | | | | Sequence Number | | | | | | | | | | | |

Table 1 illustrates an example of a Sequence Control field format. There may be 16 bits B0-B15 in the Sequence Control field, and the Sequence Control field may comprise two subfields, such as the Fragment Number subfield at the bits B0-B3 and the Sequence Number subfield at the bits B4-B15, for carrying the fragment number and the sequence number, respectively. For example, a PPDU sent by the transmitting MLD among the multiple multi-link devices MLDs may comprise a PHY header and an aggregate MAC protocol data units (A-MPDU) such as a combination of multiple MPDU subframes, a MPDU subframe among the multiple MPDU subframes may comprise an MPDU delimiter and an MPDU (in particular, with a padding coming after the MPDU), the MPDU may comprise a MAC header and an A-MSDU such as a combination of multiple MSDU subframes (in particular, with a frame check sequence (FCS) coming after the A-MSDU), and a MSDU subframe among the multiple MSDU subframes may comprise a subframe header and a MSDU (in particular, with a padding coming after the MSDU), where the Sequence Control field may be one of multiple fields of the MAC header within the MPDU carried by the PPDU. As the multiple MPDU subframes may be arranged to carry multiple MPDUs, respectively, multiple sequence numbers (SNs) may be assigned to the multiple MPDUs in the PPDU, respectively. As a result, any MPDU among the multiple MPDUs may correspond to one SN among the multiple SNs. In addition, the peer receiving MLD among the multiple multi-link devices MLDs may return a block acknowledgment (BA) to the transmitting MLD, and use the BA to notify the transmitting MLD of the correctness of the multiple MPDUs received from the transmitting MLD by the peer receiving MLD. When receiving the BA from the peer receiving MLD, the transmitting MLD may have sufficient information regarding which MPDUs have been correctly received by the peer receiving MLD, and send a series of MPDUs starting from the first MPDU that should be retransmitted according to the SNs.

The BA bitmap in the BA may correspond to a BA window, and the capability of the BA bitmap may be selected from a set of predetermined BA bitmap capabilities such as 32, 64, 128, 256, 512 and 1024. For example, when the capability of the BA bitmap is equal to 32, the BA may be arranged to acknowledge up to 32 MPDUs received by the peer receiving MLD; when the capability of the BA bitmap is equal to 64, the BA may be arranged to acknowledge up to 64 MPDUs received by the peer receiving MLD; and the rest may be deduced by analogy, for example, when the capability of the BA bitmap is equal to 1024, the BA may be arranged to acknowledge up to 1024 MPDUs received by the peer receiving MLD. The number of MPDUs in a PPDU may be much less than the capability of the BA bitmap (or the BA window).

There may be an upper limit of the total time for transmitting a PPDU, for example, 5.484 milliseconds (ms), and there may be an upper limit of the byte count of each MPDU (or A-MSDU), for example, any of 3895, 7991 and 11454 (bytes), where the time needed for transmitting the MPDU may be obtained from dividing the byte count by the PHY rate (or modulation and coding scheme (MCS)). In addition, the capability of the BA bitmap (or the BA window) may be an upper limit of the number of MPDUs in the PPDU. No matter which of the three upper limits described above is encountered, when the PHY rate is very low, the transmitting time of each MPDU will become very long, and a few number of MPDUs may cause reaching the upper limit of the total time for transmitting the PPDU, which means increasing the PHY rate may be helpful on sending more MPDUs with the PPDU(s). The upper limit of the byte count of each MPDU (or A-MSDU), such as the MPDU bytes (or A-MSDU size) limit may also be helpful on sending more MPDUs with the PPDU(s). Therefore, regarding the aforementioned three conditions, the PPDU transmitted through the link Link1 may occupy the large proportion of real-time available SNs in response of the occurrence of any of the following:

(1) the first case: there are many MPDUs within the PPDU, for example, in a situation where the PHY rate is high or the MPDU bytes/A-MSDU size limit is reached;

(2) the second case: the BA bitmap capability is small; and (3) the third case: there is a certain type of FCS error pattern in the previous PPDU.

The problem may be aroused from the air wastage phenomenon as shown in FIG. 3. For example, in the first case, assuming that the capability of the BA bitmap is equal to 256 and the PHY rate is high, and that the MPDU bytes/A-MSDU size limit is small, the PPDU transmitted through the link Link1 may comprise 230 MPDUs with the sequence numbers {SN=0, . . . , SN=229}, and the PPDU transmitted through the link Link2 may comprise 26 MPDUs with the sequence numbers {SN=230, . . . , SN=255}. For another example, in the second case, assuming that the capability of the BA bitmap is equal to 64, the PPDU transmitted through the link Link1 may comprise 50 MPDUs with the sequence numbers {SN=0, . . . , SN=49}, and the PPDU transmitted through the link Link2 may comprise 14 MPDUs with the sequence numbers {SN=50, . . . , SN=63}. For yet another example, in the third case, assuming that the capability of the BA bitmap is equal to 256, and that the real-time available SNs may comprise only 40 sequence numbers {SN=1, . . . , SN=10, SN=41, . . . , SN=70, SN=247, . . . , SN=256} due to the FCS error pattern in the previous PPDU, the PPDU transmitted through the link Link1 may comprise 30 MPDUs with the sequence numbers {SN=1, . . . , SN=10, SN=41, . . . , SN=70}, and the PPDU transmitted through the link Link2 may comprise 10 MPDUs with the sequence numbers {SN=247, . . . , SN=256}.

Figure 4:
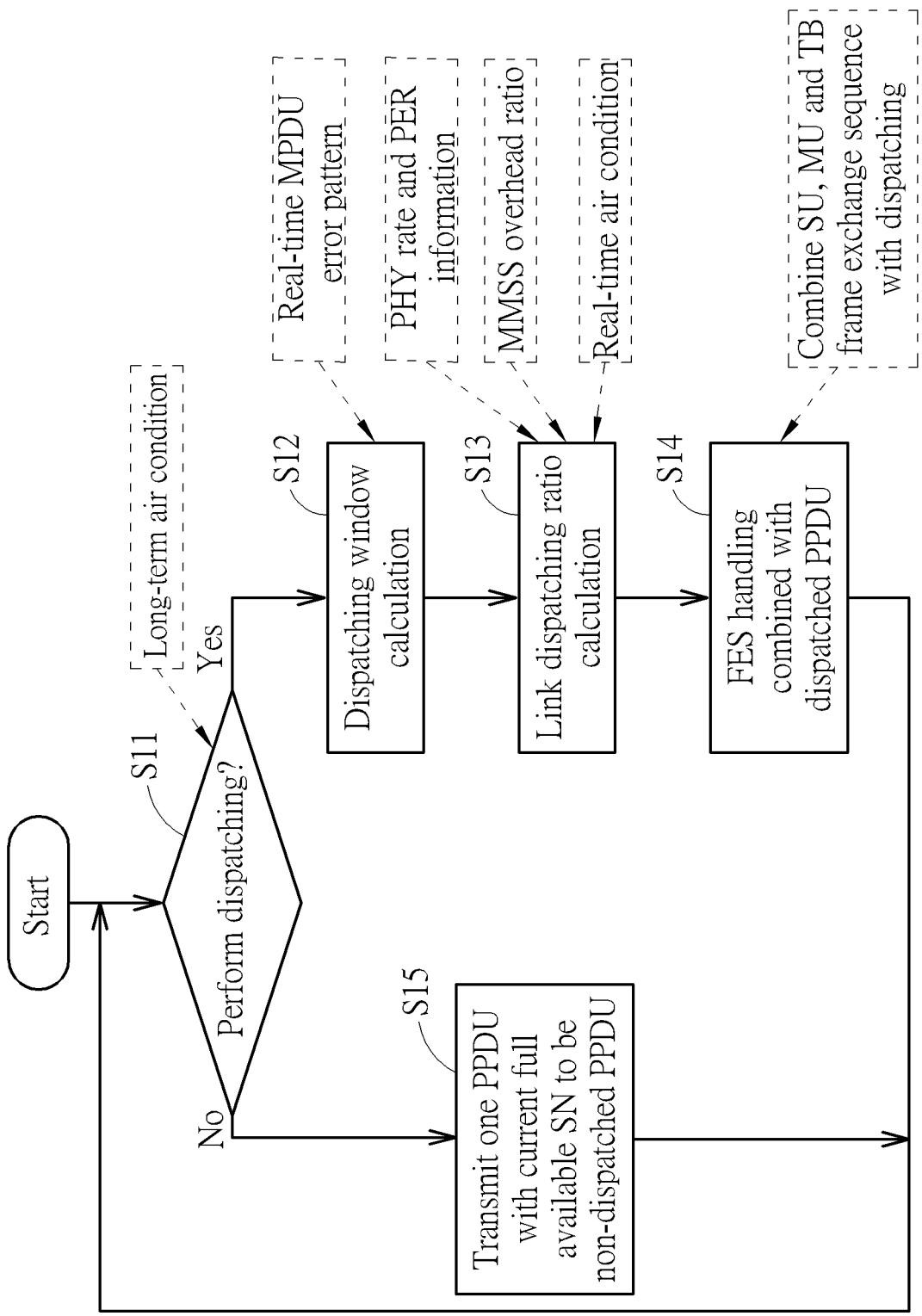
FIG. 4 is a diagram illustrating a dispatching management control scheme of a method for performing adaptive multi-link aggregation dispatching control in MLO architecture according to an embodiment of the present invention.

FIG. 4 is a diagram illustrating a dispatching management control scheme of a method for performing adaptive multi-link aggregation dispatching control in MLO architecture according to an embodiment of the present invention. The aforementioned any wireless transceiver device in the wireless communications system 100, such as any device among the AP MLD 210 and the non-AP MLD 220, may perform a dispatching management procedure of the method, and more particularly, adaptively determine whether to perform dispatching on partial data among the data corresponding to the TID N in real time. When determining to perform the dispatching, according to a plurality of predetermined factors, the wireless transceiver device may dynamically determine a reduced number of MPDUs with the associated SNs corresponding to a current BA window among the multiple BA windows, for being sent through the multiple links, respectively. For example, operations of the dispatching management procedure may comprise:

(1) in Step S11, the wireless transceiver device may utilize a dispatching decision circuit therein to decide whether to perform the dispatching by monitoring the current air condition (or the real-time air condition), where long-term air condition may be detected;

(2) in Step S12, when determining to perform the dispatching, the wireless transceiver device may utilize a dispatching window calculation circuit therein to perform dispatching window calculation, and more particularly, calculate a total dispatching window from the real time MPDU error pattern dynamically;

(3) in Step S13, the wireless transceiver device may utilize a link dispatching ratio calculation circuit therein to perform link dispatching ratio calculation, and more particularly, calculate the dispatching ratios allocated to the different multiple links according to the PHY rates, the packet error rate (PER) information, the minimum MPDU start spacing (MMSS) overhead ratios, the real-time air conditions, etc. of the multiple links, respectively;

(4) in Step S14, the wireless transceiver device may utilize a frame exchange sequence (FES) handling circuit therein to perform FES handling combined with dispatched PPDU, and more particularly, combine single user (SU), multi-user (MU) and trigger-based (TB) FES with dispatching, in order to transmit dispatched PPDUs with less numbers of SNs (or the dispatched PPDUs carrying MPDUs with the less numbers of SNs) corresponding to the current BA window through the multiple links, where the dispatching mechanism is applicable to all of the SU, the MU and the TB FES; and (5) in Step S15, when determining not to perform the dispatching, the wireless transceiver device may transmit one PPDU with current full available SNs (or the one PPDU carrying MPDUs with the current full available SNs) corresponding to the current BA window through a link among the multiple links, to be a non-dispatched PPDU;

where the wireless transceiver device may re-execute Step S11 to continue with the associated operations corresponding to the next BA window, but the present invention is not limited thereto. According to some embodiments, the dispatching management mechanism for controlling the wireless transceiver device to operate according to the dispatching management control scheme may vary, and more particularly, may be implemented by way of firmware and/or hardware in the wireless transceiver device. For example, the dispatching decision circuit, the dispatching window calculation circuit, the link dispatching ratio calculation circuit and/or the FES handling circuit may be integrated into a same circuit in the wireless transceiver device. For another example, the dispatching decision circuit, the dispatching window calculation circuit, the link dispatching ratio calculation circuit and/or the FES handling circuit may be replaced with corresponding firmware codes running on at least one microprocessor in the wireless transceiver device.

In addition, the wireless transceiver device may control the MPDU count AMPDU_CNT_LINK($N_L$) of the MPDUs in any PPDU for being transmitted to another device (e.g., the other device among the AP MLD 210 and the non-AP MLD 220) of the wireless communications system 100 through a link Link($N_L$) (e.g., $N_L$=1 or 2, for indicating the link Link1 or the link Link2) among the multiple links, in order to configure this PPDU as a dispatched PPDU or a non-dispatched PPDU. For example, the aforementioned any PPDU may be a PPDU corresponding to the current BA window, such as the PPDU with the associated SNs corresponding to the current BA window. This PPDU may be configured as the dispatched PPDU if the MPDU count AMPDU_CNT_LINK($N_L$) in the PPDU meets the condition below:

AMPDU_CNT_LINK($N_L$)<min(RT max available SN, MAX AMPDU_CNT_LINK($N_L$)); where RT max available SN may represent the real-time maximum available SN, MAX AMPDU_CNT_LINK($N_L$) may represent the maximum MPDU count measured by the Link($N_L$) single link connection setting (e.g., the single link connection setting of the link Link($N_L$)), and min(RT max available SN, MAX AMPDU_CNT_LINK($N_L$)) may represent the minimum of the real-time maximum available SN RT max available SN and the maximum MPDU count MAX AMPDU_CNT_LINK($N_L$). According to some viewpoints, the maximum MPDU count MAX AMPDU_CNT_LINK($N_L$) may be regarded as the maximum MPDU count per PPDU on the link Link($N_L$), such as the maximum number of MPDUs that may be carried in one PPDU to be transmitted to the other device through the link Link($N_L$). When $N_L$=1, the MPDU count AMPDU_CNT_LINK($N_L$) and the maximum MPDU count MAX AMPDU_CNT_LINK($N_L$) may be written as the MPDU count AMPDU_CNT_LINK1 and the maximum MPDU count MAX AMPDU_CNT_LINK1, respectively. When $N_L$=2, the MPDU count AMPDU_CNT_LINK($N_L$) and the maximum MPDU count MAX AMPDU_CNT_LINK($N_L$) may be written as the MPDU count AMPDU_CNT_LINK2 and the maximum MPDU count MAX AMPDU_CNT_LINK2, respectively.

Additionally, in any iteration of multiple iterations of the working flow shown in FIG. 4, the wireless transceiver device may perform the corresponding partial working flow therein according to a determination result (e.g., the determination result "Yes" or the determination result "No") of this iteration. For example, in response to the determination result "Yes" indicating that the dispatching should be performed, the wireless transceiver device may execute Steps S12-S14. The wireless transceiver device may perform the dispatching window calculation and the link dispatching ratio calculation in Steps S12 and S13 to determine or calculate a best dispatch ratio of the PPDU to be transmitted to the other device through the link Link($N_L$), in order to reach the best performance. For another example, in response to the determination result "No" indicating that the dispatching should not be performed, the wireless transceiver device may execute Step S15.

For better comprehension, the method may be illustrated with the working flow shown in FIG. 4, but the present invention is not limited thereto. According to some embodiments, one or more steps may be added, deleted, or changed in the working flow shown in FIG. 4. For example, the wireless transceiver device may determine whether the data transmission regarding the data corresponding to the TID N is completed after executing any step among Steps S14 and S15. More particularly, if the data transmission regarding the data corresponding to the TID N is completed, the working flow shown in FIG. 4 may come to the end; otherwise, Step S11 may be re-entered to continue with the associated operations corresponding to the next BA window. For brevity, similar descriptions for these embodiments are not repeated in detail here.

According to some embodiments, the wireless transceiver device may dynamically determine the size of any BA window among the multiple BA windows, to allow a corresponding amount of MPDUs (e.g. the MPDUs corresponding to the aforementioned any BA window) to be transmitted through one or more links among the multiple links, where the size of the aforementioned any BA window may be equal to any of multiple predetermined BA window sizes such as 1024, 512, 256, etc., but the present invention is not limited thereto. For brevity, similar descriptions for these embodiments are not repeated in detail here.

According to some embodiments, the wireless transceiver device (e.g., the aforementioned any device among the AP MLD 210 and the non-AP MLD 220) may execute a first loop comprising Steps S11-S14 at least one time in order to send multiple dispatched PPDUs to the other device (e.g., the other device among the AP MLD 210 and the non-AP MLD 220) through the multiple links, respectively, or execute a second loop comprising Steps S11 and S15 at least one time to send at least one non-dispatched PPDU to the other device through a link of the multiple links. For example, if the air condition meets a predetermined condition (or the air condition is not busy), the wireless transceiver device may execute the first loop; and if the air condition does not meet the predetermined condition (or the air condition is busy), the wireless transceiver device may execute the second loop; but the present invention is not limited thereto. In addition, the wireless transceiver device may represent one of the AP MLD 210 and the non-AP MLD 220, and the other device represent the other of the AP MLD 210 and the non-AP MLD 220, for example, as illustrated with some of the following embodiments.

Figure 5:
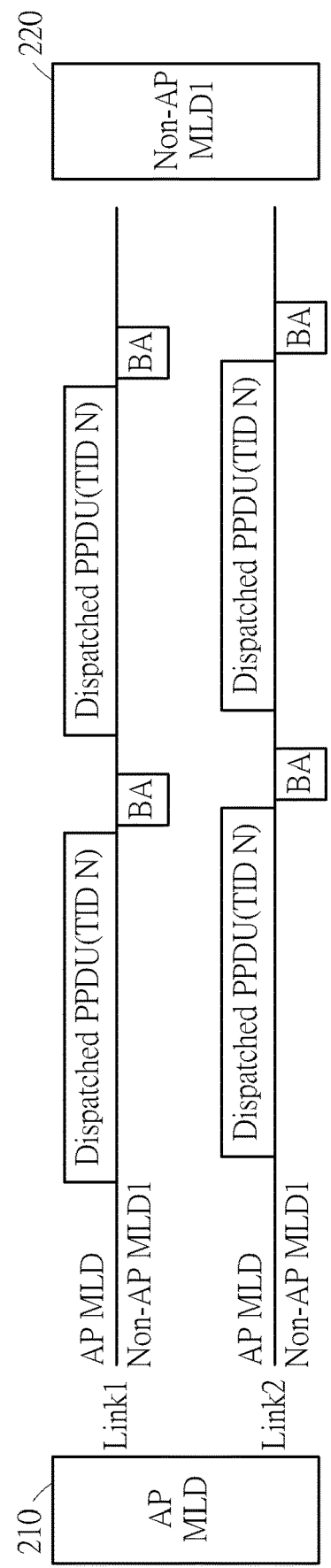
FIG. 5 is a diagram illustrating some implementation details of the dispatching management control scheme shown in FIG. 4 according to a first embodiment of the present invention.

FIG. 5 is a diagram illustrating some implementation details of the dispatching management control scheme shown in FIG. 4 according to a first embodiment of the present invention. The wireless transceiver device such as the AP MLD 210 may execute the first loop multiple times to send a first set of dispatched PPDUs, a second set of dispatched PPDUs, etc. to the other device such as the non-AP MLD 220 (e.g., the non-AP MLD #1, which may be referred to as the non-AP MLD1 for brevity) through the links Link1 and Link2, respectively, where any set of dispatched PPDUs among the first set of dispatched PPDUs, the second set of dispatched PPDUs, etc. may carry a set of partial data among the data corresponding to the TID N (labeled "Dispatched PPDU(TID N)" for brevity). In addition, the AP MLD 210 may adaptively determine a reduced number of MPDUs with the associated SNs corresponding to a BA window, to generate a set of dispatched PPDUs comprising these MPDUs, in order to make these MPDUs in the set of dispatched PPDUs be sent off or away with promptness or speed, for receiving a set of BA frames (labeled "BA" for brevity) immediately afterward without introducing the air wastage phenomenon. For example, the AP MLD 210 may transmit the first set of dispatched PPDUs corresponding to a first BA window to the non-AP MLD 220, and the non-AP MLD 220 may transmit a first set of BA frames to the AP MLD 210, where the first set of dispatched PPDUs may comprise a reduced number of MPDUs with the associated SNs corresponding to the first BA window; subsequently, the AP MLD 210 may transmit the second set of dispatched PPDUs corresponding to a second BA window to the non-AP MLD 220, and the non-AP MLD 220 may transmit a second set of BA frames to the AP MLD 210, where the second set of dispatched PPDUs may comprise a reduced number of MPDUs with the associated SNs corresponding to the second BA window; and the rest may be deduced by analogy. Additionally, the way of generating the dispatched PPDUs may be applied to the SU FES as shown in FIG. 5. For brevity, similar descriptions for this embodiment are not repeated in detail here.

Figure 6:
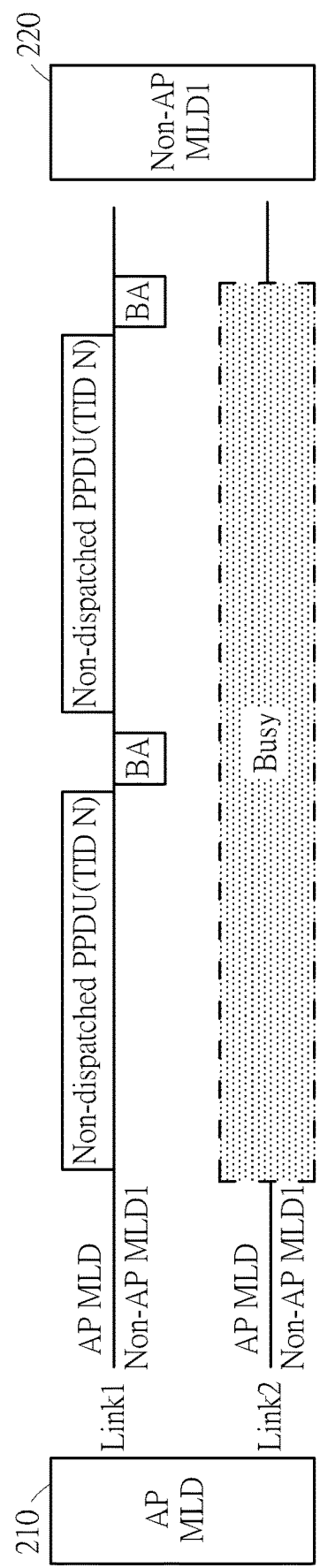
FIG. 6 is a diagram illustrating some implementation details of the dispatching management control scheme shown in FIG. 4 according to a second embodiment of the present invention.

According to some embodiments, after executing the first loop at least one time to generate and send at least one set of dispatched PPDUs corresponding to at least one BA window, such as the dispatched PPDUs shown in FIG. 5, the wireless transceiver device (e.g., the AP MLD 210) may execute the second loop at least one time to generate and send at least one non-dispatched PPDU corresponding to at least one subsequent BA window, for example, as illustrated with FIG. 6.

FIG. 6 is a diagram illustrating some implementation details of the dispatching management control scheme shown in FIG. 4 according to a second embodiment of the present invention. The wireless transceiver device such as the AP MLD 210 may execute the second loop multiple times to send a first non-dispatched PPDU, a second non-dispatched PPDU, etc. to the other device such as the non-AP MLD 220 (e.g., the non-AP MLD1) through the link Link1, where any non-dispatched PPDU among the first non-dispatched PPDU, the second non-dispatched PPDU, etc. may carry a set of partial data among the data corresponding to the TID N (labeled "Non-dispatched PPDU(TID N)" for brevity). In addition, the AP MLD 210 may determine a full available number of MPDUs with the currently full available SNs corresponding to a BA window, to generate a dispatched PPDU comprising these MPDUs and send the dispatched PPDU, for receiving a set of BA frames (labeled "BA" for brevity) immediately afterward. For example, the AP MLD 210 may transmit the first non-dispatched PPDU corresponding to a first BA window to the non-AP MLD 220, and the non-AP MLD 220 may transmit a first BA frame to the AP MLD 210; subsequently, the AP MLD 210 may transmit the second non-dispatched PPDU corresponding to a second BA window to the non-AP MLD 220, and the non-AP MLD 220 may transmit a second BA frame to the AP MLD 210; and the rest may be deduced by analogy. Additionally, the dispatching decision circuit may change the decision rule, so the way of generating the non-dispatched PPDUs may be applied to SU FES as shown in FIG. 6. For brevity, similar descriptions for this embodiment are not repeated in detail here.

According to some embodiments, after executing the second loop at least one time to generate and send at least one non-dispatched PPDU corresponding to at least one BA window, such as the non-dispatched PPDUs shown in FIG. 6, the wireless transceiver device (e.g., the AP MLD 210) may execute the first loop at least one time to generate and send at least one set of dispatched PPDU corresponding to at least one subsequent BA window, such as the dispatched PPDUs shown in FIG. 5. For brevity, similar descriptions for these embodiments are not repeated in detail here.

Figure 7:
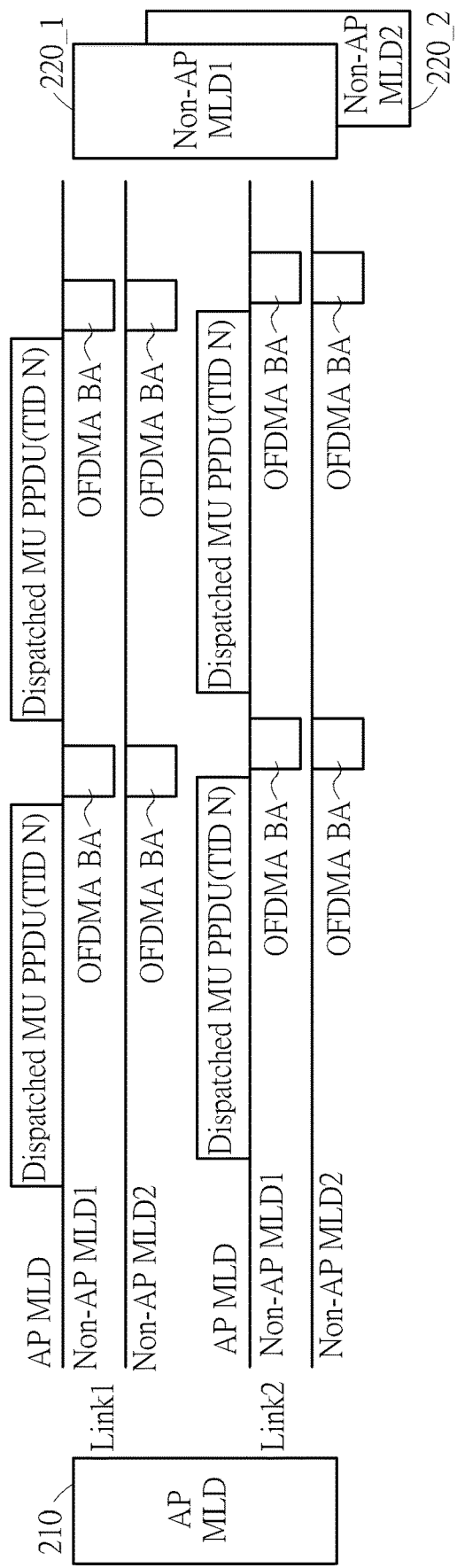
FIG. 7 is a diagram illustrating some implementation details of the dispatching management control scheme shown in FIG. 4 according to a third embodiment of the present invention.

FIG. 7 is a diagram illustrating some implementation details of the dispatching management control scheme shown in FIG. 4 according to a third embodiment of the present invention. In comparison with the embodiment shown in FIG. 5, the other device such as the non-AP MLD 220 may be replaced with two other devices in the wireless communications system 100, such as the non-AP MLDs 220_1 and 220_2 (e.g., the non-AP MLDs #1 and #2, which may be respectively referred to as the non-AP MLD1 and the non-AP MLD2 for brevity), respectively. The wireless transceiver device such as the AP MLD 210 may execute the first loop multiple times to send a first set of dispatched MU PPDUs, a second set of dispatched MU PPDUs, etc. to the two other devices such as the non-AP MLDs 220_1 and 220_2 through two sets of links Link1 and Link2 (e.g., the links Link1_1 and Link2_1 between the AP MLD 210 and the non-AP MLD 220_1, and the links Link1_2 and Link2_2 between the AP MLD 210 and the non-AP MLD 220_2), respectively, where any set of dispatched MU PPDUs among the first set of dispatched MU PPDUs, the second set of dispatched MU PPDUs, etc. may carry a set of partial data among the data corresponding to the TID N (labeled "Dispatched MU PPDU(TID N)" for brevity). In addition, the AP MLD 210 may adaptively determine a reduced number of MPDUs with the associated SNs to generate a set of dispatched MU PPDUs comprising these MPDUs, in order to make these MPDUs in the set of dispatched MU PPDUs be sent off or away with promptness or speed, for receiving a set of orthogonal frequency division multiple access (OFDMA) BA frames (labeled "OFDMA BA" for brevity) immediately afterward without introducing the air wastage phenomenon. Additionally, the two non-AP MLDs 220_1 and 220_2 may be connected to the AP MLD 210, and the way of generating the dispatched MU PPDUs may be applied to the MU FES as shown in FIG. 7. For brevity, similar descriptions for this embodiment are not repeated in detail here.

Figure 8:
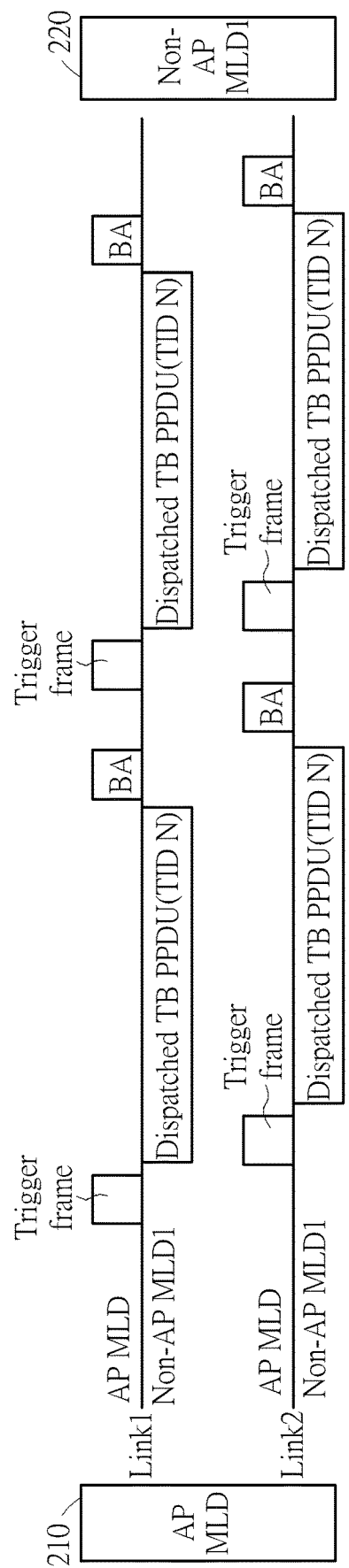
FIG. 8 is a diagram illustrating some implementation details of the dispatching management control scheme shown in FIG. 4 according to a fourth embodiment of the present invention.

FIG. 8 is a diagram illustrating some implementation details of the dispatching management control scheme shown in FIG. 4 according to a fourth embodiment of the present invention. In comparison with the embodiment shown in FIG. 5, the AP MLD 210 may be arranged to send multiple trigger frames, and the non-AP MLD 220 (e.g., the non-AP MLD1) may be arranged to generate and send multiple dispatched TB PPDUs in response to the multiple trigger frames, respectively. More particularly, the non-AP MLD 220 may execute the first loop multiple times to send a first set of dispatched TB PPDUs, a second set of dispatched TB PPDUs, etc. to the AP MLD 210 through the links Link1 and Link2, respectively, where any set of dispatched TB PPDUs among the first set of dispatched TB PPDUs, the second set of dispatched TB PPDUs, etc. may carry a set of partial data among the data corresponding to the TID N (labeled "Dispatched TB PPDU(TID N)" for brevity). In addition, the non-AP MLD 220 may adaptively determine a reduced number of MPDUs with the associated SNs corresponding to a BA window, to generate a set of dispatched TB PPDUs comprising these MPDUs, in order to make these MPDUs in the set of dispatched TB PPDUs be sent off or away with promptness or speed, for receiving a set of BA frames (labeled "BA" for brevity) immediately afterward without introducing the air wastage phenomenon. For example, in response to a first set of trigger frames among the multiple trigger frames, the non-AP MLD 220 may transmit the first set of dispatched TB PPDUs corresponding to a first BA window to the AP MLD 210, and the AP MLD 210 may transmit a first set of BA frames to the non-AP MLD 220, where the first set of dispatched TB PPDUs may comprise a reduced number of MPDUs with the associated SNs corresponding to the first BA window; subsequently, in response to a second set of trigger frames among the multiple trigger frames, the non-AP MLD 220 may transmit the second set of dispatched TB PPDUs corresponding to a second BA window to the AP MLD 210, and the AP MLD 210 may transmit a second set of BA frames to the non-AP MLD 220, where the second set of dispatched TB PPDUs may comprise a reduced number of MPDUs with the associated SNs corresponding to the second BA window; and the rest may be deduced by analogy. Additionally, the traffic direction may be configured as the direction from the non-AP MLD 220 to the AP MLD 210, and the way of generating the dispatched PPDU may be applied to the TB FES as shown in FIG. 8. For brevity, similar descriptions for this embodiment are not repeated in detail here.

Figure 9:
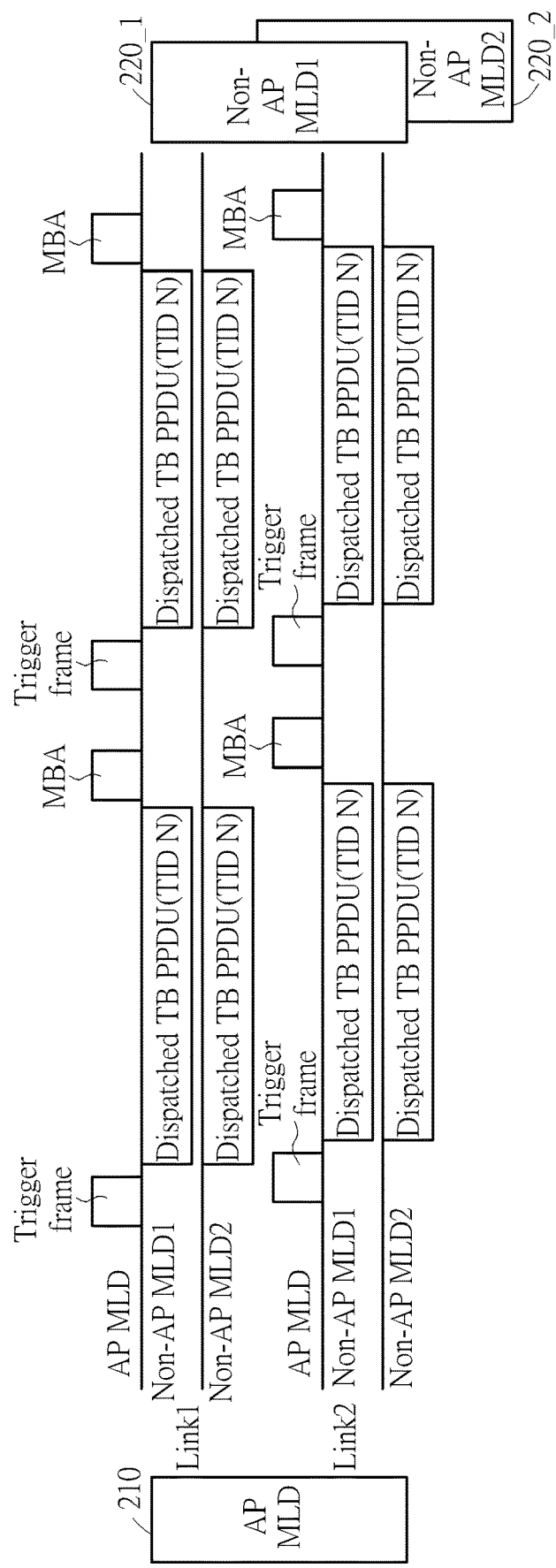
FIG. 9 is a diagram illustrating some implementation details of the dispatching management control scheme shown in FIG. 4 according to a fifth embodiment of the present invention.

FIG. 9 is a diagram illustrating some implementation details of the dispatching management control scheme shown in FIG. 4 according to a fifth embodiment of the present invention. In comparison with the embodiment shown in FIG. 8, the other device such as the non-AP MLD 220 may be replaced with the two other devices mentioned in the embodiment shown in FIG. 7, such as the non-AP MLDs 220_1 and 220_2 (e.g., the non-AP MLD1 and the non-AP MLD2), respectively. More particularly, the non-AP MLD 220_y (e.g., y=1 or 2) may execute the first loop multiple times to send a first set of dispatched TB PPDUs, a second set of dispatched TB PPDUs, etc. to the AP MLD 210 through the corresponding set of links Link1 and Link2 (e.g., the links Link1_y and Link2_y between the AP MLD 210 and the non-AP MLD 220_y), respectively, where any set of dispatched TB PPDUs among the first set of dispatched TB PPDUs, the second set of dispatched TB PPDUs, etc. may carry a set of partial data among the data corresponding to the TID N (labeled "Dispatched TB PPDU (TID N)" for brevity). In addition, the non-AP MLD 220_y may adaptively determine a reduced number of MPDUs with the associated SNs corresponding to a BA window, to generate a set of dispatched TB PPDUs comprising these MPDUs, in order to make these MPDUs in the set of dispatched TB PPDUs be sent off or away with promptness or speed, for receiving a set of BA frames respectively carried by a set of multi-station BA (MBA) frames (labeled "MBA" for brevity) immediately afterward without introducing the air wastage phenomenon. For example, in response to a first set of trigger frames among the multiple trigger frames, the non-AP MLD 220_y may transmit the first set of dispatched TB PPDUs corresponding to a first BA window to the AP MLD 210, and the AP MLD 210 may transmit a first set of MBA frames to allow the non-AP MLD 220_y to receive one set of BA frames respectively carried by the first set of MBA frames, where the first set of dispatched TB PPDUs may comprise a reduced number of MPDUs with the associated SNs corresponding to the first BA window, and any MBA frame among the first set of MBA frames may comprise two BA frames, for being received by the non-AP MLDs 220_1 and 220_2, respectively; subsequently, in response to a second set of trigger frames among the multiple trigger frames, the non-AP MLD 220_y may transmit the second set of dispatched TB PPDUs corresponding to a second BA window to the AP MLD 210, and the AP MLD 210 may transmit a second set of MBA frames to allow the non-AP MLD 220_y to receive one set of BA frames respectively carried by the second set of MBA frames, where the second set of dispatched TB PPDUs may comprise a reduced number of MPDUs with the associated SNs corresponding to the second BA window, and any MBA frame among the second set of MBA frames may comprise two BA frames, for being received by the non-AP MLDs 220_1 and 220_2, respectively; and the rest may be deduced by analogy. For brevity, similar descriptions for this embodiment are not repeated in detail here.

Figure 10:
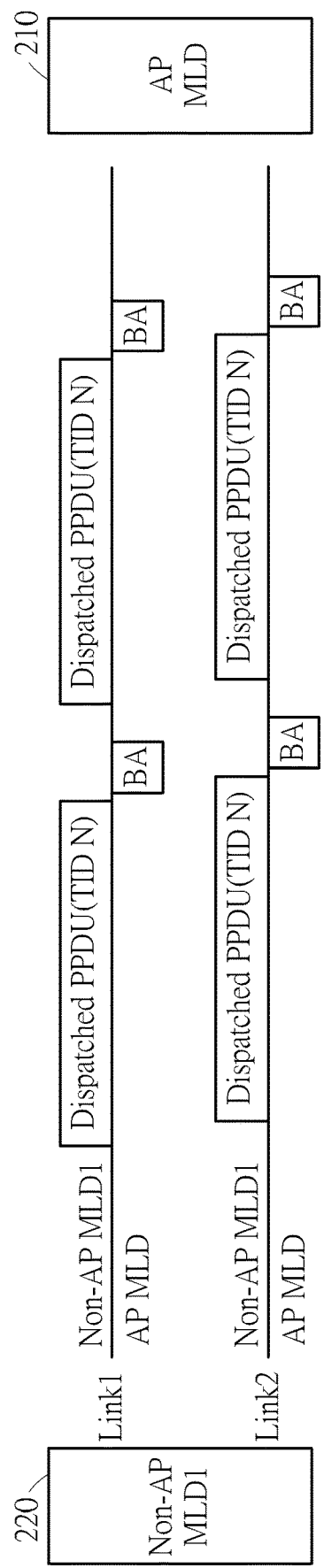
FIG. 10 is a diagram illustrating some implementation details of the dispatching management control scheme shown in FIG. 4 according to a sixth embodiment of the present invention.

FIG. 10 is a diagram illustrating some implementation details of the dispatching management control scheme shown in FIG. 4 according to a sixth embodiment of the present invention. In comparison with the embodiment shown in FIG. 5, the traffic direction may be configured as the direction from the non-AP MLD 220 (e.g., the non-AP MLD1) to the AP MLD 210. More particularly, the non-AP MLD 220 may execute the first loop multiple times to send a first set of dispatched PPDUs, a second set of dispatched PPDUs, etc. to the AP MLD 210 through the links Link1 and Link2, respectively, where any set of dispatched PPDUs among the first set of dispatched PPDUs, the second set of dispatched PPDUs, etc. may carry a set of partial data among the data corresponding to the TID N (labeled "Dispatched PPDU(TID N)" for brevity). In addition, the non-AP MLD 220 may adaptively determine a reduced number of MPDUs with the associated SNs corresponding to a BA window, to generate a set of dispatched PPDUs comprising these MPDUs, in order to make these MPDUs in the set of dispatched PPDUs be sent off or away with promptness or speed, for receiving a set of BA frames (labeled "BA" for brevity) immediately afterward without introducing the air wastage phenomenon. For example, the non-AP MLD 220 may transmit the first set of dispatched PPDUs corresponding to a first BA window to the AP MLD 210, and the AP MLD 210 may transmit a first set of BA frames to the non-AP MLD 220, where the first set of dispatched PPDUs may comprise a reduced number of MPDUs with the associated SNs corresponding to the first BA window; subsequently, the non-AP MLD 220 may transmit the second set of dispatched PPDUs corresponding to a second BA window to the AP MLD 210, and the AP MLD 210 may transmit a second set of BA frames to the non-AP MLD 220, where the second set of dispatched PPDUs may comprise a reduced number of MPDUs with the associated SNs corresponding to the second BA window; and the rest may be deduced by analogy. For brevity, similar descriptions for this embodiment are not repeated in detail here.

According to some embodiments, the aforementioned any wireless transceiver device may provide a priority-based service for different kinds of applications, and manage multiple access categories (ACs) such as the four ACs {AC_VO, AC_VI, AC_BE, AC_BK} corresponding to voice, video, best effort, and background traffics, respectively.

Figure 11:
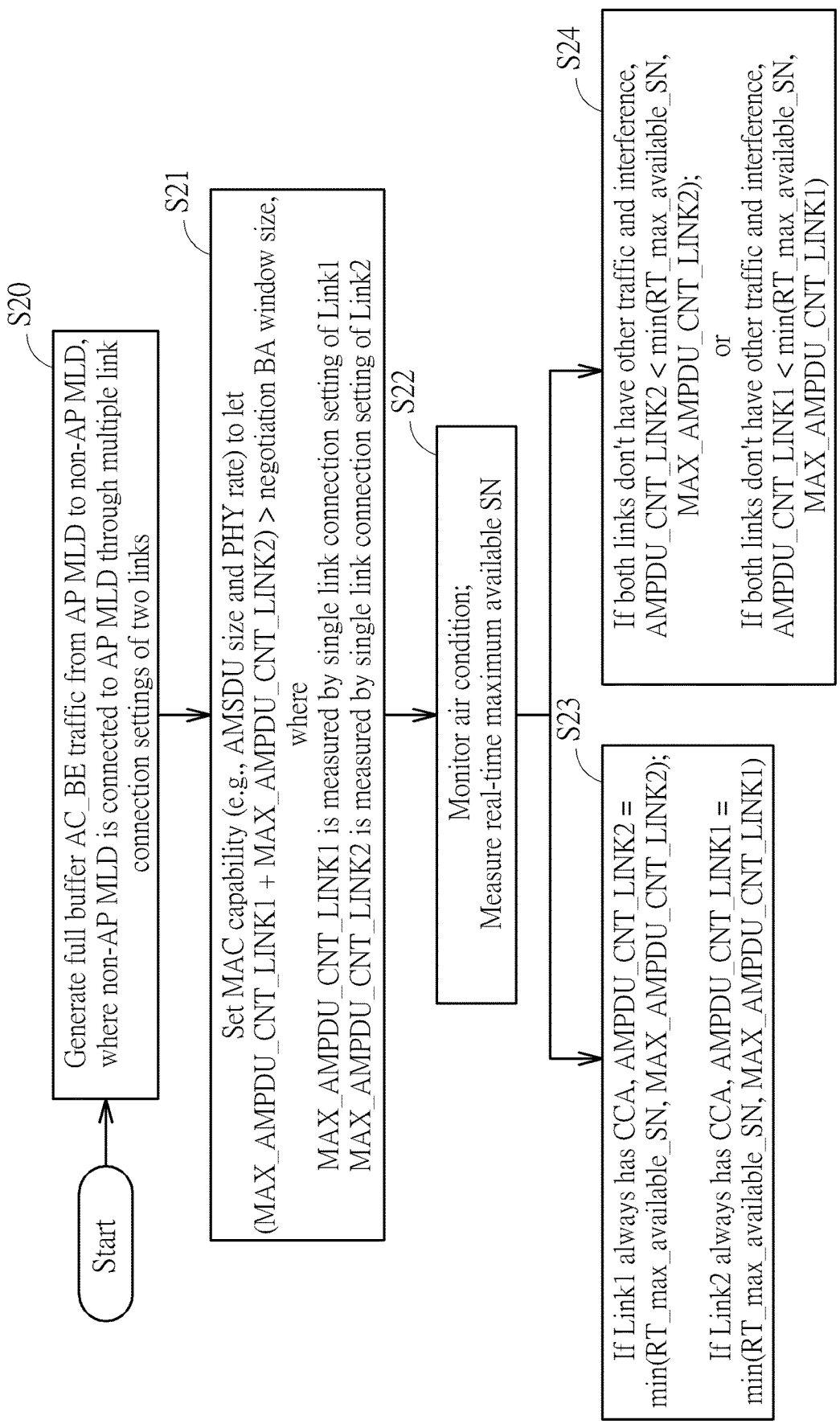
FIG. 11 illustrates some details of a dispatching management procedure involved with the dispatching management control scheme shown in FIG. 4 according to the method according to an embodiment of the present invention.

FIG. 11 illustrates some details of the dispatching management procedure involved with the dispatching management control scheme shown in FIG. 4 according to an embodiment of the present invention. The aforementioned any wireless transceiver device may communicate with at least one other device within the wireless communications system 100 to set up the multiple links respectively corresponding to the multiple predetermined radio frequency bands, to allow the wireless transceiver device and the aforementioned at least one other device to perform the data transmission regarding the data corresponding to the TID N through the multiple links, and more particularly, perform the dispatching management procedure to act in response to some conditions being met as illustrated with the working flow shown in FIG. 11. In addition, the wireless transceiver device and the aforementioned at least one other device may represent the AP MLD 210 and the non-AP MLD 220, respectively, for example, as illustrated with the embodiments shown in FIG. 5 and FIG. 6, but the present invention is not limited thereto.

In Step S20, the wireless transceiver device such as the AP MLD 210 may generate a full buffer AC_BE traffic from the AP MLD 210 to the non-AP MLD 220, where the non-AP MLD 220 is connected to the AP MLD 210 through multiple link connection settings of the two links Link1 and Link2. For example, the wireless transceiver device may receive the data corresponding to the TID N from a source device to generate the full buffer AC_BE traffic of the data.

In Step S21, the wireless transceiver device such as the AP MLD 210 may set the MAC capability (e.g., the A-MSDU size and the PHY rate) to let or make the summation (MAX AMPDU_CNT_LINK1+MAX AMPDU_CNT_LINK2) of the maximum MPDU count MAX AMPDU_CNT_LINK1 and the maximum MPDU count MAX AMPDU_CNT_LINK2 be greater than the negotiation BA window size, where the maximum MPDU count MAX AMPDU_CNT_LINK1 is measured by the Link1 single link connection setting (e.g., the single link connection setting of the link Link1), and the maximum MPDU count MAX AMPDU_CNT_LINK2 is measured by the Link2 single link connection setting (e.g., the single link connection setting of the link Link2).

In Step S22, the wireless transceiver device such as the AP MLD 210 may monitor the air condition during a monitoring period, and measure the real-time maximum available SN RT max available SN.

In Step S23, the wireless transceiver device such as the AP MLD 210 may perform at least one checking operation to generate at least one checking result, and more particularly, refer to the aforementioned at least one checking result to selectively execute at least one operation among the following operations:

(1) if the link Link1 always has the Clear Channel Assessment (CCA) issue (e.g., the channel of the link Link1 is busy) during the monitoring period, the wireless transceiver device may control the MPDU count AMPDU_CNT_LINK2 to be equal to the minimum min(RT max available SN, MAX AMPDU_CNT_LINK2) of the real-time maximum available SN RT max available SN and the maximum MPDU count MAX AMPDU_CNT_LINK2, in order to transmit at least one non-dispatched PPDU corresponding to at least one BA window through the link Link2, where the respective timing charts of the links Link1 and Link2 shown in FIG. 6 may be exchanged according to another embodiment, in which the non-dispatched PPDUs illustrated on the timing chart of the link Link2 may be taken as examples of the aforementioned at least one non-dispatched PPDU transmitted through the link Link2; and (2) if the link Link2 always has the CCA issue (e.g., the channel of the link Link2 is busy) during the monitoring period, the wireless transceiver device may control the MPDU count AMPDU_CNT_LINK1 to be equal to the minimum min(RT max available SN, MAX AMPDU_CNT_LINK1) of the real-time maximum available SN RT max available SN and the maximum MPDU count MAX AMPDU_CNT_LINK1, in order to transmit at least one non-dispatched PPDU corresponding to at least one BA window through the link Link1, where the non-dispatched PPDUs shown in FIG. 6 may be taken as examples of the aforementioned at least one non-dispatched PPDU transmitted through the link Link1.

In Step S24, the wireless transceiver device such as the AP MLD 210 may refer to the aforementioned at least one checking result to selectively execute at least one operation among the following operations:

(1) if both links Link1 and Link2 do not have other traffic and interference during the monitoring period, the wireless transceiver device may control the MPDU count AMPDU_CNT_LINK2 to be less than the minimum min(RT max available SN, MAX AMPDU_CNT_LINK2) of the real-time maximum available SN RT max available SN and the maximum MPDU count MAX AMPDU_CNT_LINK2, in order to transmit at least one dispatched PPDU corresponding to at least one BA window through the link Link2, for example, as illustrated with the timing chart of the link Link2 shown in FIG. 5; and (1) if both links Link1 and Link2 do not have other traffic and interference during the monitoring period, the wireless transceiver device may control the MPDU count AMPDU_CNT_LINK1 to be less than the minimum min(RT max available SN, MAX AMPDU_CNT_LINK1) of the real-time maximum available SN RT max available SN and the maximum MPDU count MAX AMPDU_CNT_LINK1, in order to transmit at least one dispatched PPDU corresponding to at least one BA window through the link Link1, for example, as illustrated with the timing chart of the link Link1 shown in FIG. 5.

For better comprehension, the method may be illustrated with the working flow shown in FIG. 11, but the present invention is not limited thereto. According to some embodiments, one or more steps may be added, deleted, or changed in the working flow shown in FIG. 11. For example, the wireless transceiver device may perform the aforementioned at least one checking operation on at least one partial working flow between Steps S22-S24, for determine whether the link Link1 or the link Link2 always has the CCA issue or both links Link1 and Link2 do not have other traffic and interference during the monitoring period. For brevity, similar descriptions for these embodiments are not repeated in detail here.

According to some embodiments, the aforementioned at least one other device may comprise multiple other devices such as multiple non-AP MLDs {220_y} (e.g., the non-AP MLDs 220_1 and 220_2), for example, as illustrated with the embodiment shown in FIG. 7. In addition, the AP MLD 210 and any non-AP MLD 220_y among the multiple non-AP MLDs {220_y} may perform the associated operations as illustrated with the working flow shown in FIG. 11. For brevity, similar descriptions for these embodiments are not repeated in detail here.

According to some embodiments, the wireless transceiver device may represent the non-AP MLD 220 or the non-AP MLD 220_y, and the aforementioned at least one other device may represent the AP MLD 210, for example, as illustrated with the embodiments shown in FIGS. 8-10. In this situation, the wireless transceiver device (e.g., the non-AP MLD 220 or the non-AP MLD 220_y) may generate the full buffer AC_BE traffic of an inversed direction (e.g., the full buffer AC_BE traffic from the non-AP MLD 220 or the non-AP MLD 220_y to the AP MLD 210) in Step S20. For brevity, similar descriptions for these embodiments are not repeated in detail here.

Figure 12:
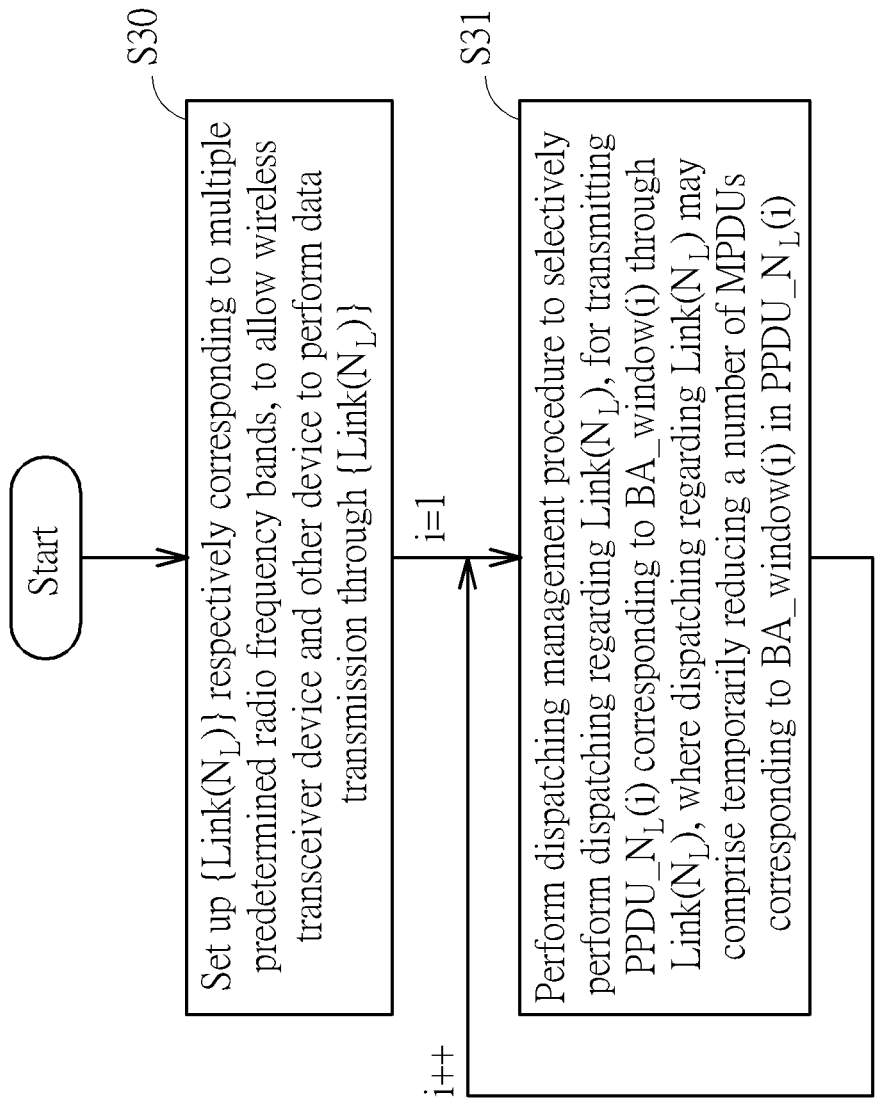
FIG. 12 illustrates a main working flow of the method according to an embodiment of the present invention.

FIG. 12 illustrates a main working flow of the method according to an embodiment of the present invention. The aforementioned any wireless transceiver device may operate according to the method to selectively perform the dispatching regarding any link among the multiple links (e.g., the links {Link($N_L$)} such as the links Link1 and Link2), and more particularly, selectively perform the dispatching regarding at least one link Link($N_L$) among the links {Link($N_L$)}, in order to send off partial data among the data corresponding to the TID N through the links {Link($N_L$)} promptly, for receiving a set of BA frames immediately afterward without introducing the air wastage phenomenon.

In Step S30, the wireless transceiver device may communicate with another device within the wireless communications system 100 to set up the links {Link($N_L$)} (e.g., the links Link1 and Link2) respectively corresponding to the multiple predetermined radio frequency bands (e.g., the 2.4 GHz band and the 5 GHz band), to allow the wireless transceiver device and the other device to perform the data transmission regarding the data corresponding to the TID N through the links {Link($N_L$)}.

In Step S31, the wireless transceiver device may perform the dispatching management procedure to selectively perform the dispatching regarding the link Link($N_L$) among the links {Link($N_L$)}, for transmitting a PPDU PPDU_$N_L$ (i) corresponding to a BA window BA window(i) through the link Link($N_L$), where the dispatching regarding the link Link($N_L$) may comprise temporarily reducing a number of MPDUs corresponding to the BA window BA window(i) in the PPDU PPDU_$N_L$(i), such as the MPDU count AMPDU_CNT_LINK($N_L$) of the MPDUs in the PPDU PPDU_$N_L$(i) for being transmitted to the other device through the link Link($N_L$). For example, the wireless transceiver device may perform the operation of Step S31 for each link Link($N_L$) among the links {Link($N_L$)}.

More particularly, the wireless transceiver device may perform the dispatching management procedure to selectively perform the dispatching regarding the links Link1 and Link2, respectively, for transmitting the PPDUs PPDU_1 (i) and PPDU_2 (i) corresponding to the BA window BA window(i) through the links Link1 and Link2, respectively, where the dispatching regarding the links Link1 and Link2 may comprise temporarily reducing the numbers of MPDUs corresponding to the BA window BA window(i) in the PPDUs PPDU_1 (i) and PPDU_2 (i), respectively. In addition, the wireless transceiver device may adjust the number of the MPDUs corresponding to the BA window BA window(i) in the PPDU PPDU_1 (i) (e.g., the MPDU count AMPDU_CNT_LINK1(i) of the MPDUs in the PPDU PPDU_1 (i) for being transmitted to the other device through the link Link1) and the number of the MPDUs corresponding to the BA window BA window(i) in the PPDU PPDU_2 (i) (e.g., the MPDU count AMPDU_CNT_LINK2(i) of the MPDUs in the PPDU PPDU_2(i) for being transmitted to the other device through the link Link2) according to settings of the links Link1 and Link2, respectively, for balancing a first time period T1 (i) for transmitting the PPDU PPDU_1(i) and a second time period T2(i) for transmitting the PPDU PPDU_2 (i), in order to make the respective transmission of the PPDUs PPDU_1(i) and PPDU_2 (i) corresponding to the BA window BA window(i) be completed at the same time.

As shown in FIG. 12, the wireless transceiver device may perform the dispatching management procedure multiple times as indicated by the loop index i, where the loop index i may have a predetermined initial value such as one (labeled "i=1" for brevity), and may increase with a predetermined increment such as one (labeled "i++" for brevity). In addition, the BA window BA_window(i) may represents any BA window BA_window(i) corresponding to the index i among multiple BA windows {BA_window(i)|i=1, 2, ... }, and the multiple BA windows {BA_window(i)|i=1, 2, ... } may comprise a BA window BA_window(i1) and a BA window BA_window(i2), where i1 and i2 may be different positive integers. The wireless transceiver device may perform the dispatching on both of the following: the PPDUs PPDU_1 (i1) and PPDU_2(i1) corresponding to the BA window BA_window(i1); and any PPDU PPDU_$N_L$(i2) (e.g. $N_L$=1 or 2) corresponding to the BA_window BA_window(i2).

The wireless transceiver device may adaptively adjust first numbers of MPDUs corresponding to the BA window BA window(i1) in the PPDUs PPDU_1(i1) and PPDU_2(i1) (e.g., the MPDU count AMPDU_CNT_LINK1(i1) of the MPDUs in the PPDU PPDU_1(i1) for being transmitted to the other device through the link Link1, and the MPDU count AMPDU_CNT_LINK2(i1) of the MPDUs in the PPDU PPDU_1(i1) for being transmitted to the other device through the link Link2), respectively, and adaptively adjust a second number of MPDUs corresponding to the BA window BA window(i2) in the aforementioned any PPDU PPDU_$N_L$ (i2) corresponding to the BA window BA window (i2) (e.g., the MPDU count AMPDU_CNT_LINK($N_L$, i2) of the MPDUs in the PPDU PPDU_$N_L$(i2) for being transmitted to the other device through the link Link($N_L$)), where the first numbers are less than the second number. For better comprehension, the associated operations regarding the index i may correspond to an iteration IT(i) of the working flow shown in FIG. 4, but the present invention is not limited thereto. Assuming that i1<i2, after executing the first loop in the iteration IT(i1) to generate and send the dispatched PPDUs PPDU_1(i1) and PPDU_2(i1) corresponding to the BA window BA_window(i1), such as the dispatched PPDUs shown in FIG. 5, the wireless transceiver device may execute the second loop in the iteration IT(i2) to generate and send the non-dispatched PPDU PPDU_$N_L$(i2) corresponding to the BA window BA window(i2), for example, as illustrated with FIG. 6. Assuming that i1>i2, after executing the second loop in the iteration IT(i2) to generate and send the non-dispatched PPDU PPDU_$N_L$ (i2) corresponding to the BA window BA window(i2), such as the non-dispatched PPDUs shown in FIG. 6, the wireless transceiver device may execute the first loop in the iteration IT(i1) to generate and send the dispatched PPDUs PPDU_1(i1) and PPDU_2(i1) corresponding to the BA window BA window(i1), such as the dispatched PPDUs shown in FIG. 5.

Assuming that i3 is a positive integer different from any of i1 and i2, the multiple BA windows {BA_window(i)|i=1, 2, . . . } may further comprise a BA window BA window(i3), and the wireless transceiver device may perform the dispatching on the PPDU PPDU_1(i3) corresponding to the BA window BA window(i3). When i1<i2<i3, the wireless transceiver device may adaptively adjust the first numbers (e.g., the MPDU counts AMPDU_CNT_LINK1(i1) and AMPDU_CNT_LINK2(i1)), respectively, and adaptively adjust the second number (e.g., the MPDU count AMPDU_CNT_LINK($N_L$, i2)) afterward, and further adaptively adjust third numbers of MPDUs corresponding to the BA window BA window(i3) in the PPDUs PPDU_1(i3) and PPDU_2(i3) (e.g., the MPDU count AMPDU_CNT_LINK1 (i3) of the MPDUs in the PPDU PPDU_1(i3) for being transmitted to the other device through the link Link1, and the MPDU count AMPDU_CNT_LINK2(i3) of the MPDUs in the PPDU PPDU_1(i3) for being transmitted to the other device through the link Link2), respectively, where all of the first numbers and the third numbers are less than the second number.

For better comprehension, the method may be illustrated with the working flow shown in FIG. 12, but the present invention is not limited thereto. According to some embodiments, one or more steps may be added, deleted, or changed in the working flow shown in FIG. 12. For example, at the bottommost partial working flow in the working flow shown in FIG. 12, the wireless transceiver device may perform a checking operation to determine whether the data transmission regarding the data corresponding to the TID N is completed. If the data transmission regarding the data corresponding to the TID N is completed, the working flow shown in FIG. 12 may come to the end; otherwise, Step S31 may be re-entered to continue with the next partial data among the data corresponding to the TID N. For brevity, similar descriptions for these embodiments are not repeated in detail here.

According to some embodiments, the negotiation BA window size may be equal to a selected BA window size among the multiple predetermined BA window sizes, which may be measured in unit of SN and/or MPDU. For example, the selected BA window size may be equal to 256, and the associated operations may comprise:

(1) assuming that the PER is equal to zero when i=1, the wireless transceiver device may execute the second loop in the iteration IT(1) to generate and send the non-dispatched PPDUs PPDU_1(1) and PPDU_2(1) corresponding to the BA window BA window(1), where the PPDUs PPDU_1(1) and PPDU_2(1) may carry the MPDUs with the SNs {0, 1, . . . , 127} and the MPDUs with the SNs {128, 129, . . . , 255}, respectively;

(2) assuming that the PER increases when i=2, the wireless transceiver device may execute the first loop in the iteration IT(2) to generate and send the dispatched PPDUs PPDU_1(2) and PPDU_2(2) corresponding to the BA window BA window(2), where the PPDUs PPDU_1(2) and PPDU_2(2) may carry the MPDUs with the SNs {256, 257, . . . , 355} and the MPDUs with the SNs {356, 357, . . . , 455}, respectively;

(3) assuming that the PER decreases when i=3, the wireless transceiver device may execute the second loop in the iteration IT(3) to generate and send the non-dispatched PPDUs PPDU_1(3) and PPDU_2(3) corresponding to the BA window BA window(3), where the PPDUs PPDU_1(3) and PPDU_2(3) may carry the MPDUs with the SNs {456, 457, . . . , 583} and the MPDUs with the SNs {584, 585, . . . , 711}, respectively;

(4) assuming that the PER increases again when i=4, the wireless transceiver device may execute the first loop in the iteration IT(4) to generate and send the dispatched PPDUs PPDU_1(4) and PPDU_2(4) corresponding to the BA window BA window(4), where the PPDUs PPDU_1(4) and PPDU_2(4) may carry the MPDUs with the SNs {712, 713, . . . , 721} and the MPDUs with the SNs {722, 723, . . . , 731}, respectively;

(5) assuming that the channel on the link Link2 is busy when i=5, 6 or 7, the wireless transceiver device may execute the second loop in the iterations IT(5), IT(6) and IT(7) to generate and send the non-dispatched PPDUs PPDU_1(5), PPDU_1(6) and PPDU_1(7) corresponding to the BA windows BA window(5), BA window(6) and BA window(7), respectively, where the PPDUs PPDU_1(5), PPDU_1(6) and PPDU_1(7) may carry the MPDUs with the SNs {732, 733, . . . , 987}, the MPDUs with the SNs {988, 989, . . . , 1246} and the MPDUs with the SNs {1244, 1245, . . . , 1499}, respectively;

(6) assuming that the channel on the link Link2 exits from the busy state and the PER is high when i=8, the wireless transceiver device may execute the first loop in the iteration IT(8) to generate and send the dispatched PPDUs PPDU_1(8) and PPDU_2(8) corresponding to the BA window BA window(8), where the PPDUs PPDU_1(8) and PPDU_2(8) may carry the MPDUs with the SNs {1500, 1501, . . . , 1549} and the MPDUs with the SNs {1550, 1551, . . . , 1599}, respectively;

where regarding any iteration IT(i) in which the respective channels of the links {Link($N_L$)} are not busy, the MPDU counts {AMPDU_CNT_LINK($N_L$, i)} (e.g., the MPDU counts AMPDU_CNT_LINK1(i) and AMPDU_CNT_LINK2(i)) may be equal to each other, but the present invention is not limited thereto. For brevity, similar descriptions for these embodiments are not repeated in detail here.

According to some embodiments, regarding any iteration IT(i) in which the respective channels of the links {Link($N_L$)} are not busy, the wireless transceiver device may adjust the MPDU counts {AMPDU_CNT_LINK($N_L$, i)} (e.g., the MPDU counts AMPDU_CNT_LINK1(i) and AMPDU_CNT_LINK2(i)) according to the settings of the links {Link($N_L$)}, respectively, for balancing the time periods {T $N_L$(i)} (e.g., the time periods T1(i) and T2(i)) for transmitting the PPDUs {PPDU_$N_L$ (i)}, in order to make the respective transmission of the PPDUs {PPDU_$N_L$(i)} corresponding to the BA window BA window(i) be completed at the same time. In addition, the channels of the links Link1 and Link2 may have been configured to have a first bandwidth BW(1) and a second bandwidth BW(2), respectively. When the bandwidths BW(1) and BW(2) are equal to each other, for example, the bandwidths BW(1) and BW(2) may be 40 MHz bandwidths, respectively, the wireless transceiver device may control the MPDU counts AMPDU_CNT_LINK1(i) and AMPDU_CNT_LINK2(i) to be equal to each other (e.g., AMPDU_CNT_LINK1(i)=AMPDU_CNT_LINK2(i)=50). When the first bandwidth BW(1) and the second bandwidth BW(2) are different from each other, for example, the bandwidths BW(1) and BW(2) may be 40 MHz bandwidth and 80 MHz bandwidth, respectively, the wireless transceiver device may control the MPDU counts AMPDU_CNT_LINK1(i) and AMPDU_CNT_LINK2(i) correspondingly (e.g., AMPDU_CNT_LINK1(i)=33 and AMPDU_CNT_LINK2(i)=66), to make the ratio (AMPDU_CNT_LINK1(i)/AMPDU_CNT_LINK2(i)) of the MPDU count AMPDU_CNT_LINK1(i) to the MPDU count AMPDU_CNT_LINK2(i) be equal to or approximately equal to the ratio (BW(1)/BW(2)) of the first bandwidth BW(1) to the second bandwidth BW(2). For brevity, similar descriptions for these embodiments are not repeated in detail here.

According to some embodiments, the wireless transceiver device and the other device may be configured to operate as a set of MLDs, where the set of MLDs may comprise an AP MLD (e.g., the AP MLD 210) and a non-AP MLD (e.g., the non-AP MLD 220 or the non-AP MLD 220_y). In addition, the wireless transceiver device may perform the dispatching management procedure, for improving air utilization for MLOs between the AP MLD and the non-AP MLD. For brevity, similar descriptions for these embodiments are not repeated in detail here.

According to some embodiments, in any iteration IT(i) among the iterations {IT(i) i=1, 2, ... }, the total dispatching window mentioned in Step S12 may comprise the summation (AMPDU_CNT_LINK1(i)+AMPDU_CNT_LINK2(i)) of the MPDU counts AMPDU_CNT_LINK1(i) and AMPDU_CNT_LINK2(i), and the dispatching ratios mentioned in Step S13 may comprise at least one ratio between the MPDU counts AMPDU_CNT_LINK1(i) and AMPDU_CNT_LINK2(i), such as the ratio (AMPDU_CNT_LINK1(i)/AMPDU_CNT_LINK2(i)) of the MPDU count AMPDU_CNT_LINK1(i) to the MPDU count AMPDU_CNT_LINK2(i) and/or the ratio (AMPDU_CNT_LINK2(i)/AMPDU_CNT_LINK1(i)) of the MPDU count AMPDU_CNT_LINK2(i) to the MPDU count AMPDU_CNT_LINK1(i), but the present invention is not limited thereto. For brevity, similar descriptions for these embodiments are not repeated in detail here.

In the embodiments described above, the 2.4 GHz band and the 5 GHz band, the corresponding APs AP1 and AP2, the corresponding STAs STA1 and STA2 and the corresponding links Link1 and Link2 may be taken as examples of the multiple predetermined radio frequency bands, the multiple APs, the multiple non-AP STAs and the multiple links, respectively, but the present invention is not limited thereto. According to some embodiments, the multiple predetermined radio frequency bands, the multiple APs, the multiple non-AP STAs and the multiple links may vary, and/or the respective numbers thereof may increase. More particularly, the 2.4 GHz band, the 5 GHz band and the 6 GHz band, the corresponding APs AP1, AP2 and AP3, the corresponding STAs STA1, STA2 and STA3 and the corresponding links Link1, Link2 and Link3 may be taken as examples of the multiple predetermined radio frequency bands, the multiple APs, the multiple non-AP STAs and the multiple links, respectively. The wireless transceiver device may perform the dispatching management procedure to selectively perform the dispatching regarding the links Link1, Link2 and Link3, respectively, for transmitting the PPDUs PPDU_1(i), PPDU_2 (i) and PPDU_3 (i) corresponding to the BA window BA window(i) through the links Link1, Link2 and Link3, respectively, where the dispatching regarding the links Link1, Link2 and Link3 may comprise temporarily reducing the numbers of MPDUs corresponding to the BA window BA window(i) in the PPDUs PPDU_1(i), PPDU_2 (i) and PPDU_3 (i), respectively. In addition, the wireless transceiver device may adjust the number of the MPDUs corresponding to the BA window BA window(i) in the PPDU PPDU_1(i) (e.g., the MPDU count AMPDU_CNT_LINK1(i)), the number of the MPDUs corresponding to the BA window BA window(i) in the PPDU PPDU_2 (i) (e.g., the MPDU count AMPDU_CNT_LINK2 (i)) and the number of the MPDUs corresponding to the BA window BA window(i) in the PPDU PPDU_3(i) (e.g., the MPDU count AMPDU_CNT_LINK3(i) of the MPDUs in the PPDU PPDU_3 (i) for being transmitted to the other device through the link Link3) according to settings of the links Link1, Link2 and Link3, respectively, for balancing the first time period T 1(*i*) for transmitting the PPDU PPDU_1 (i), the second time period T2(i) for transmitting the PPDU PPDU_2 (i) and a third time period T3(i) for transmitting the PPDU PPDU_3 (i), in order to make the respective transmission of the PPDUs PPDU_1(i), PPDU_2 (i) and PPDU_3 (i) corresponding to the BA window BA window(i) be completed at the same time. For brevity, similar descriptions for these embodiments are not repeated in detail here.

According to some embodiments, in any iteration IT(i) among the iterations {IT(i) i=1, 2, ... }, the total dispatching window mentioned in Step S12 may comprise the summation $\Sigma\_N_L$ (AMPDU_CNT_LINK($N_L$, i)) of the MPDU counts {AMPDU_CNT_LINK($N_L$, i)}, and the dispatching ratios mentioned in Step S13 may comprise at least one ratio between any two MPDU counts AMPDU_CNT_LINK($N_L\_1$, i) and AMPDU_CNT_LINK($N_L\_2$, i) among the MPDU counts {AMPDU_CNT_LINK($N_L$, i)}, such as the ratio (AMPDU_CNT_LINK($N_L\_1$, i)/AMPDU_CNT_LINK($N_L\_2$, i)) and/or the ratio (AMPDU_CNT_LINK($N_L\_2$, i)/AMPDU_CNT_LINK($N_L\_1$, i)), but the present invention is not limited thereto. For example, the dispatching ratios mentioned in Step S13 may comprise the ratio of the MPDU count AMPDU_CNT_LINK($N_L$, i) to the summation $\Sigma\_N_L$(AMPDU_CNT_LINK($N_L$, i)). For better comprehension, as the index i may be omitted in the same iteration IT(i), the summation $\Sigma\_N_L$ (AMPDU_CNT_LINK $(N_L, i)$) of the MPDU counts {AMPDU_CNT_LINK$(N_L, i)$} may be rewritten as the summation $\Sigma\_N_L$(AMPDU_CNT_LINK$(N_L)$) of the MPDU counts {AMPDU_CNT_LINK$(N_L)$}, and the aforementioned any two MPDU counts AMPDU_CNT_LINK$(N_L\_1, i)$ and AMPDU_CNT_LINK$(N_L\_2, i)$ among the MPDU counts {AMPDU_CNT_LINK$(N_L, i)$} may be rewritten as two MPDU counts AMPDU_CNT_LINK$(N_L\_1)$ and AMPDU_CNT_LINK$(N_L\_2)$ among the MPDU counts {AMPDU_CNT_LINK$(N_L)$}. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing adaptive multi-link aggregation dispatching control in multi-link operation (MLO) architecture, the method being applicable to a wireless transceiver device within a wireless communications system, the method comprising:
   utilizing the wireless transceiver device to communicate with another device within the wireless communications system to set up multiple links respectively corresponding to multiple predetermined radio frequency bands, to allow the wireless transceiver device and the other device to perform data transmission through the multiple links; and
   performing a dispatching management procedure to selectively perform dispatching regarding a first link among the multiple links, for transmitting a first physical layer (PHY) protocol data unit (PPDU) corresponding to a block acknowledgment (BA) window through the first link, wherein the dispatching regarding the first link comprises temporarily reducing a number of medium access control (MAC) protocol data units (MPDUs) corresponding to the BA window that have their own sequence numbers (SNs) different from each other in the first PPDU, for balancing respective PPDU transmission periods of at least two PPDUs corresponding to the BA window that are transmitted through at least two links among the multiple links.

2. The method of claim 1, further comprising:
   performing the dispatching management procedure to selectively perform dispatching regarding a second link among the multiple links, for transmitting a second PPDU corresponding to the BA window through the second link, wherein the dispatching regarding the second link comprises temporarily reducing a number of MPDUs corresponding to the BA window in the second PPDU.

3. The method of claim 2, wherein the wireless transceiver device is arranged to adjust the number of the MPDUs corresponding to the BA window in the first PPDU and the number of the MPDUs corresponding to the BA window in the second PPDU according to settings of the first link and the second link, respectively, for balancing a first time period for transmitting the first PPDU and a second time period for transmitting the second PPDU.

4. The method of claim 2, further comprising:
   performing the dispatching management procedure to selectively perform dispatching regarding a third link among the multiple links, for transmitting a third PPDU corresponding to the BA window through the third link, wherein the dispatching regarding the third link comprises temporarily reducing a number of MPDUs corresponding to the BA window in the third PPDU.

5. The method of claim 4, wherein the wireless transceiver device is arranged to adjust the number of the MPDUs corresponding to the BA window in the first PPDU, the number of the MPDUs corresponding to the BA window in the second PPDU, and the number of the MPDUs corresponding to the BA window in the third PPDU according to settings of the first link, the second link, and the third link, respectively, for balancing a first time period for transmitting the first PPDU, a second time period for transmitting the second PPDU, and a third time period for transmitting the third PPDU.

6. A method for performing adaptive multi-link aggregation dispatching control in multi-link operation (MLO) architecture, the method being applicable to a wireless transceiver device within a wireless communications system, the method comprising:
   utilizing the wireless transceiver device to communicate with another device within the wireless communications system to set up multiple links respectively corresponding to multiple predetermined radio frequency bands, to allow the wireless transceiver device and the other device to perform data transmission through the multiple links; and
   performing a dispatching management procedure to selectively perform dispatching regarding a first link among the multiple links, for transmitting a first physical layer (PHY) protocol data unit (PPDU) corresponding to a block acknowledgment (BA) window through the first link, wherein the dispatching regarding the first link comprises temporarily reducing a number of medium access control (MAC) protocol data units (MPDUs) having different sequence numbers (SNs) corresponding to the BA window in the first PPDU, for balancing respective PPDU transmission periods of at least two PPDUs corresponding to the BA window that are transmitted through at least two links among the multiple links;
   wherein the BA window represents any BA window among multiple BA windows, and the multiple BA windows comprises a first BA window and a second BA window; and the wireless transceiver device is arranged to perform the dispatching on both a first PPDU corresponding to the first BA window and a second PPDU corresponding to the second BA window.

7. The method of claim 6, wherein the wireless transceiver device is arranged to adaptively adjust a first number of MPDUs corresponding to the first BA window in the first PPDU and a second number of MPDUs corresponding to the second BA window in the second PPDU, wherein a ratio between the first number and the second number will be adjusted.

8. The method of claim 6, wherein the multiple BA windows further comprises a third BA window; and the wireless transceiver device is arranged to perform the dispatching on a third PPDU corresponding to the third BA window.

9. The method of claim 8, wherein the wireless transceiver device is arranged to adaptively adjust a first number of MPDUs corresponding to the first BA window in the first PPDU, a second number of MPDUs corresponding to the second BA window in the second PPDU, and third number of MPDUs corresponding to the third BA window in the third PPDU, wherein a ratio between any number among the first and the third numbers and the second number will be adjusted.

10. The method of claim 1, wherein the data transmission represents data transmission regarding data corresponding to a predetermined traffic identifier (TID), and the wireless transceiver device is arranged to perform the dispatching management procedure to adaptively determine whether to perform the dispatching on partial data among the data corresponding to the predetermined TID in real time.

11. A method for performing adaptive multi-link aggregation dispatching control in multi-link operation (MLO) architecture, the method being applicable to a wireless transceiver device within a wireless communications system, the method comprising:
    utilizing the wireless transceiver device to communicate with another device within the wireless communications system to set up multiple links respectively corresponding to multiple predetermined radio frequency bands, to allow the wireless transceiver device and the other device to perform data transmission through the multiple links; and
    performing a dispatching management procedure to selectively perform dispatching regarding a first link among the multiple links, for transmitting a first physical layer (PHY) protocol data unit (PPDU) corresponding to a block acknowledgment (BA) window through the first link, wherein the dispatching regarding the first link comprises temporarily reducing a number of medium access control (MAC) protocol data units (MPDUs) having different sequence numbers (SNs) corresponding to the BA window in the first PPDU, for balancing respective PPDU transmission periods of at least two PPDUs corresponding to the BA window that are transmitted through at least two links among the multiple links;
    wherein the dispatching management procedure comprises:
    deciding whether to perform the dispatching by monitoring a current air condition;
    in response to a first determination result indicating that the dispatching should be performed, performing dispatching window calculation and link dispatching ratio calculation to determine a dispatch ratio of the first PPDU to be transmitted to the other device through the first link; and
    performing frame exchange sequence (FES), in order to transmit the first PPDU corresponding to the BA window through the first link.

12. The method of claim 1, wherein the wireless transceiver device and the other device are configured to operate as a set of multi-link devices (MLDs), where the set of MLDs comprise an access point (AP) MLD and a non-AP MLD; and the wireless transceiver device is arranged to perform the dispatching management procedure, for improving air utilization for MLOs between the AP MLD and the non-AP MLD.

13. The method of claim 1, wherein a ratio between the number of the MPDUs corresponding to the BA window in the first PPDU and a minimum of the following two numbers, a real-time maximum available SN and a maximum MPDU count measured by single link connection setting of the first link, will be adjusted.

14. The method of claim 1, wherein the first PPDU is one of a single user (SU) PPDU, a multi-user (MU) PPDU and a trigger-based (TB) PPDU.

15. A wireless transceiver device, for performing adaptive multi-link aggregation dispatching control in multi-link operation (MLO) architecture, the wireless transceiver device being one of multiple devices within a wireless communications system, the wireless transceiver device comprising:
    a processing circuit, arranged to control operations of the wireless transceiver device; and
    at least one communications control circuit, coupled to the processing circuit, arranged to perform communications control, wherein the at least one communications control circuit is arranged to perform wireless communications operations with another device among the multiple devices for the wireless transceiver device;
    wherein:
    the wireless transceiver device is arranged to communicate with the other device to set up multiple links respectively corresponding to multiple predetermined radio frequency bands, to allow the wireless transceiver device and the other device to perform data transmission through the multiple links; and
    the wireless transceiver device is arranged to perform a dispatching management procedure to selectively perform dispatching regarding a first link among the multiple links, for transmitting a first physical layer (PHY) protocol data unit (PPDU) corresponding to a block acknowledgment (BA) window through the first link, wherein the dispatching regarding the first link comprises temporarily reducing a number of medium access control (MAC) protocol data units (MPDUs) corresponding to the BA window that have their own sequence numbers (SNs) which are different from each other in the first PPDU, for balancing respective PPDU transmission periods of at least two PPDUs corresponding to the BA window that are transmitted through at least two links among the multiple links.

16. The method of claim 1, wherein the BA window represents any BA window among multiple BA windows, and the multiple BA windows comprises a first BA window and a second BA window; the wireless transceiver device is arranged to perform the dispatching on both a further first PPDU corresponding to the first BA window and a further second PPDU corresponding to the second BA window; and the wireless transceiver device is arranged to adaptively adjust a first number of MPDUs corresponding to the first BA window in the further first PPDU and a second number of MPDUs corresponding to the second BA window in the further second PPDU, wherein a ratio between the first number and the second number will be adjusted according to circumstances.

* * * * *